(12) United States Patent
Matsuno et al.

(10) Patent No.: US 7,104,058 B2
(45) Date of Patent: Sep. 12, 2006

(54) VEHICLE BRAKING SYSTEM

(75) Inventors: Isao Matsuno, Nagano (JP); Kazuhiro Tagata, Nagano (JP); Yasushi Aoki, Saitama (JP); Kenji Suzuki, Saitama (JP)

(73) Assignees: Nissin Kogyo Co., Ltd., Nagano (JP); Honda Motor Co., Ltd., Tokyo (JP)

( * ) Notice: Subject to any disclaimer, the term of this patent is extended or adjusted under 35 U.S.C. 154(b) by 55 days.

(21) Appl. No.: 11/002,893

(22) Filed: Dec. 3, 2004

(65) Prior Publication Data

US 2005/0160730 A1 Jul. 28, 2005

(30) Foreign Application Priority Data

Dec. 5, 2003 (JP) ............................. 2003-406913

(51) Int. Cl.
*B60T 13/14* (2006.01)
*B60T 13/12* (2006.01)
*B60T 11/20* (2006.01)

(52) U.S. Cl. ........................... 60/552; 60/554; 60/562; 91/422

(58) Field of Classification Search ................. 60/552, 60/553, 554, 562, 560; 91/422, 423, 434, 91/181 R, 181 P
See application file for complete search history.

(56) References Cited

U.S. PATENT DOCUMENTS 4,802,713 A * 2/1989 Ogino ......................... 303/19
5,735,124 A * 4/1998 Cords et al. ................. 60/553
6,183,049 B1 * 2/2001 Oka et al. .................... 60/552
6,352,316 B1 * 3/2002 Oka et al. .................... 60/552
6,513,884 B1 * 2/2003 Nishii et al. ............. 303/114.1
6,705,682 B1 * 3/2004 Kusano et al. ............... 60/552

FOREIGN PATENT DOCUMENTS

| DE | 36 27 902 A1 | 2/1988 |
| DE | 37 36 059 A1 | 5/1989 |
| DE | 38 17 178 A1 | 11/1989 |
| DE | 39 06411 A1 | 9/1990 |
| JP | 4-283157 | 10/1992 |

\* cited by examiner

*Primary Examiner*—Igor Kershteyn
(74) *Attorney, Agent, or Firm*—Arent Fox PLLC

(57) ABSTRACT

In a vehicle braking system, a backup piston pushes a master piston directly from behind when hydraulic pressure of a boosted hydraulic pressure chamber decreases. The backup piston has a piston body which is slidably fitted in a casing, and a pusher which is slidably fitted in the casing with a seal diameter smaller than seal diameters of the master piston and the piston body and which extends to the front end of the piston body, to push the master piston from behind. An annular input chamber communicated with a hydraulic power source is formed between the backup piston and the casing. When the pusher pushes the master piston forward, amount of volume increased in the boosted hydraulic pressure chamber is set to be substantially equal to amount of volume decreased in the input chamber. Thus, it is possible to avoid increase in the hydraulic pressure of the boosted hydraulic pressure chamber during forward movement of the backup piston, using a simple configuration with a reduced number of parts.

7 Claims, 9 Drawing Sheets

VEHICLE BRAKING SYSTEM

RELATED APPLICATION DATA

The Japanese priority application No. 2003-406913 upon which the present application is based is hereby incorporated in its entirety herein by reference.

BACKGROUND OF THE INVENTION

1. Field of the Invention

The present invention relates to a vehicle braking system comprising: a master cylinder in which a master piston with its back turned to a boosted hydraulic pressure chamber is slidably housed in a casing; a backup piston which is slidably housed in the casing with its front face turned to the boosted hydraulic pressure chamber and with its backward limit fixed, to push the master piston directly from behind in response to operation of a brake operating member when the hydraulic pressure of the boosted hydraulic pressure chamber decreases; and pressure regulating means which applies output hydraulic pressure of a hydraulic power source to the boosted hydraulic pressure chamber after regulating the output hydraulic pressure according to brake operating input from the brake operating member; the master cylinder being connected to wheel brakes.

2. Description of the Related Art

Such a vehicle braking system is disclosed, for example, in Japanese Patent Application Laid-Open No. 4-283157.

However, in the conventional vehicle braking system, seal diameter of a backup piston on a casing is set larger than seal diameter of a master piston on the casing. Consequently, when the hydraulic pressure of a boosted hydraulic pressure chamber decreases due to a defect of a hydraulic power source, if the backup piston moves forward in response to operation of a brake operating member, the amount of volume decreased in the boosted hydraulic pressure chamber caused by the forward movement of the backup piston will exceed the amount of volume increased in the boosted hydraulic pressure chamber caused by the forward movement of the master piston, resulting in increase in the hydraulic pressure of the boosted hydraulic pressure chamber to speed up the movement of the backup piston if no measure is taken. To avoid such a situation, an emergency control valve is interposed between the boosted hydraulic pressure chamber and a reservoir to communicate the boosted hydraulic pressure chamber with the reservoir as the hydraulic pressure of the hydraulic power source decreases. This not only complicates the configuration, but also increases the number of parts.

SUMMARY OF THE INVENTION

The present invention has been made in view of the above circumstances and has an object to provide a vehicle braking system which can avoid increase in the hydraulic pressure of a boosted hydraulic pressure chamber during forward movement of a backup piston, using a simple configuration with a reduced number of parts.

To achieve the above object, according to a first feature of the present invention, there is provided a vehicle braking system comprising: a master cylinder in which a master piston with its back turned to a boosted hydraulic pressure chamber is slidably housed in a casing; a backup piston which is slidably housed in the casing with its front face turned to the boosted hydraulic pressure chamber and with its backward limit fixed, to push the master piston directly from behind in response to operation of a brake operating member when the hydraulic pressure of the boosted hydraulic pressure chamber decreases; and pressure regulating means which applies output hydraulic pressure of a hydraulic power source to the boosted hydraulic pressure chamber after regulating the output hydraulic pressure according to brake operating input from the brake operating member; the master cylinder being connected to wheel brakes, wherein the backup piston comprises a piston body which is slidably fitted in the casing with substantially the same seal diameter as a seal diameter of the master piston, and a pusher which is slidably fitted in the casing with a seal diameter smaller than the seal diameters of the master piston and the piston body and which coaxially extends to the front end of the piston body so as to abut against and push the rear end of the master piston, wherein an annular input chamber is formed between the backup piston and the casing so as to be communicated with the hydraulic power source, with axially opposite ends of the annular input chamber sealed by sealing members interposed between the piston body and the casing and between the pusher and the casing, respectively, wherein the backup piston contains pressure regulating means interposed between an output chamber and the input chamber which are connected to the boosted hydraulic pressure chamber, so as to communicate the input chamber with the output chamber and to communicate the output chamber with a reservoir when the output hydraulic pressure of the hydraulic power source decreases, and wherein when the pusher pushes the master piston forward, amount of volume increased in the boosted hydraulic pressure chamber is set to be substantially equal to amount of volume decreased in the input chamber.

With the configuration of the first feature, since reduction in the hydraulic pressure of the input chamber, i.e., reduction in the hydraulic pressure of the hydraulic power source, causes reduction in the hydraulic force which presses the backup piston toward the backward limit, it is possible to advance the backup piston according to operation of the brake pedal, abut against the pusher in the front part of the backup piston against the master piston with a clearance provided between the casing and the inner contact surface of the master piston to advance the master piston in this state, thereby applying brake hydraulic pressure to the wheel brakes from the master cylinder. When the backup piston and master piston move forward in this way, there is no increase in the hydraulic pressure of the boosted hydraulic pressure chamber, because the piston body of the backup piston is substantially equal in seal diameter to the master piston, because the amount of volume increased in the boosted hydraulic pressure chamber is substantially equal to the amount of volume decreased in the input chamber when the pusher of the backup piston pushes the master piston in the forward direction, and because the boosted hydraulic pressure chamber is communicated with the input chamber via the pressure regulating means. Thus, it is possible to avoid increase in the hydraulic pressure of the boosted hydraulic pressure chamber during forward movement of the backup piston, using a simple configuration with a reduced number of parts, without need for any emergency control valve conventionally required.

According to a second feature of the present invention, in addition to the configuration of the first feature, spring-urging means which urges the backup piston and the master piston in a direction to separate the pistons from each other is installed between the pistons whose fully retracted positions in the casing are limited. This configuration ensures an idle stroke according to reduction in the hydraulic pressure of the hydraulic power source when advancing the backup piston with the brake pedal, because the backward piston is urged backward by the spring-urging means.

According to a third feature of the present invention, in addition to the configuration of the second feature, the combined force of backward hydraulic pressure which acts on the backup piston as the output hydraulic pressure of the hydraulic power source acts on the input chamber and spring force of the spring-urging means which urges the backup piston in the backward direction is set at 300 to 1000 N. With this configuration, by urging the backup piston in the backward direction with a force of 300 N or more, it is possible to urge the backup piston reliably in the backward direction taking into consideration the output hydraulic pressure of the hydraulic power source and sliding resistance of the backup piston. Also, by urging the backup piston in the backward direction with a force of 1000 N or less, it is possible to prevent the master piston from being pushed into the master cylinder.

According to a fourth feature of the present invention, in addition to the configuration of any of the first to third features, a normally closed linear solenoid valve for automatic brake pressurization is interposed between the boosted hydraulic pressure chamber and the hydraulic power source, while a normally open linear solenoid valve for automatic brake depressurization and a first one-way valve are interposed between the output chamber and the boosted hydraulic pressure chamber, where the first one-way valve is connected in parallel to the linear solenoid valve for automatic brake depressurization to allow the brake fluid to flow from the output chamber to the boosted hydraulic pressure chamber.

With the configuration of the fourth feature, even when the brake pedal is not operated and thus the pressure regulating means is not operating, it is possible to perform automatic brake control in which the brake hydraulic pressure is caused to act on the wheel brakes in a non-braking situation by opening and closing the linear solenoid valve for automatic brake pressurization and the linear solenoid valve for automatic brake depressurization to regulate the hydraulic pressure of the boosted hydraulic pressure chamber. Moreover, when the linear solenoid valve for automatic brake depressurization is closed in automatic braking mode, it is possible to activate the pressure regulating means by operating the brake pedal. Thus, if hydraulic pressure higher than that of the boosted hydraulic pressure chamber occurs in the output chamber, the hydraulic pressure of the output chamber can be caused to act on the boosted hydraulic pressure chamber via the first one-way valve, to thereby operate the master cylinder as during normal braking operations.

According to a fifth feature of the present invention, in addition to the configuration of the first feature, a normally closed pressure-reducing linear solenoid valve for regeneration and coordination is interposed between the boosted hydraulic pressure chamber and the reservoir, while a normally open pressurizing linear solenoid valve for regeneration and coordination and a second one-way valve are interposed between the output chamber and the boosted hydraulic pressure chamber, where the second one-way valve is connected in parallel to the pressurizing linear solenoid valve for regeneration and coordination to allow the brake fluid to flow from the boosted hydraulic pressure chamber to the output chamber.

With the configuration of the fifth aspect, during regeneration in a braking operation, by opening and closing the pressurizing linear solenoid valve for regeneration and coordination and the pressure-reducing linear solenoid valve for regeneration and coordination to regulate the hydraulic pressure of the boosted hydraulic pressure chamber, it is possible to output brake hydraulic pressure from the master cylinder in a state offset from that during a normal braking operation. By returning the brake pedal when the pressurizing linear solenoid valve for regeneration and coordination is closed, it is possible to release the hydraulic pressure of the boosted hydraulic pressure chamber to the reservoir via the second one-way valve.

The above and other objects, features, and advantages of the present invention will become readily apparent from the following detailed description of the preferred embodiments thereof taken in conjunction with the accompanying drawings.

DESCRIPTION OF THE PREFERRED EMBODIMENTS

Figure 1:
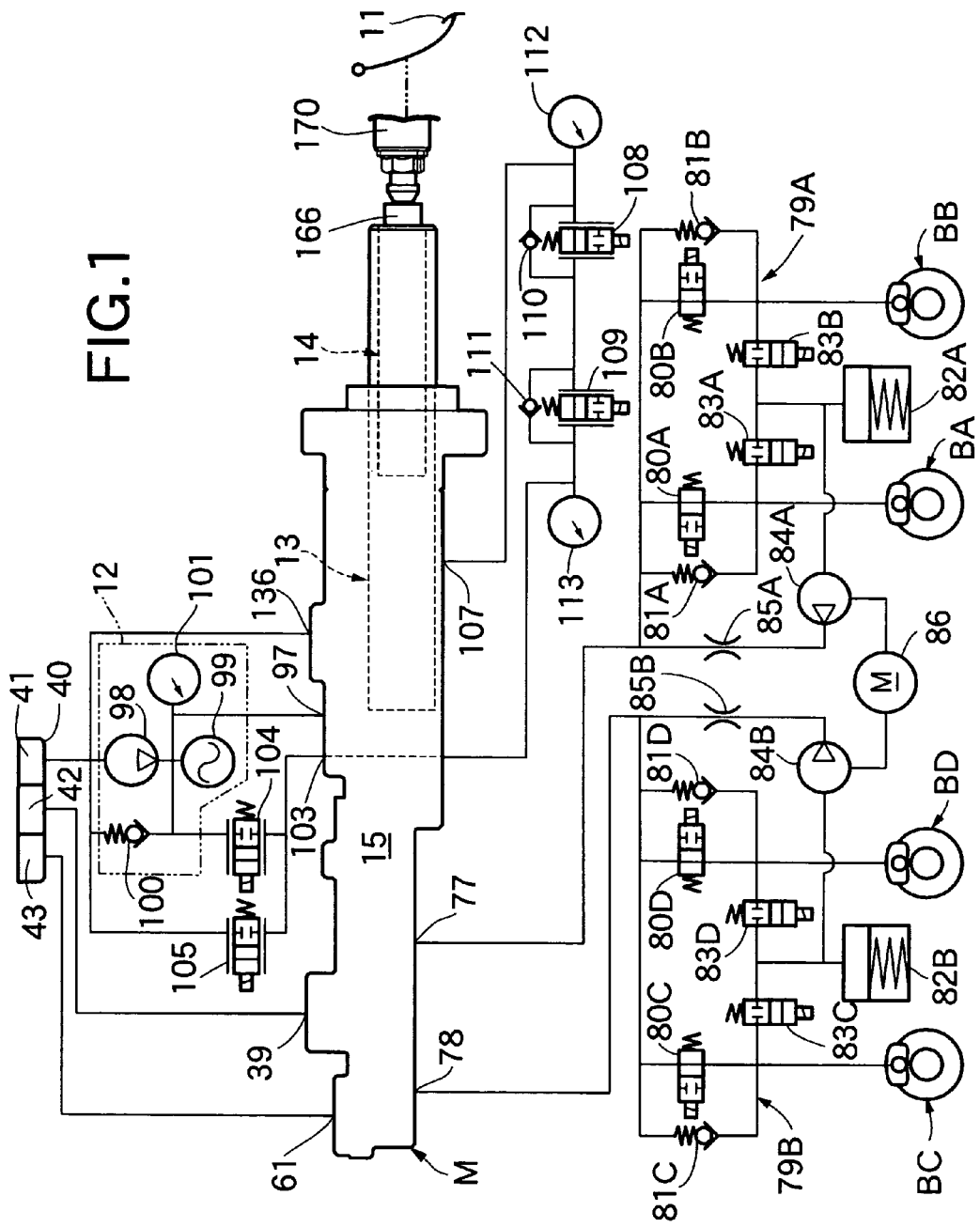
FIG. 1 is a brake hydraulic system diagram showing an overall configuration of a vehicle braking system according to a first embodiment of the present invention.

A first embodiment of the present invention will be described with reference to FIGS. 1 to 8. Referring first to FIG. 1, a braking system for a four-wheeled vehicle comprises: a tandem master cylinder M; a hydraulic booster 13 which regulates hydraulic pressure of a hydraulic power source 12 according to a brake operating force inputted from a brake pedal 11 serving as a brake operating member, and which applies the hydraulic pressure to the master cylinder M; and a brake stroke simulator 14 interposed between the brake pedal 11 and hydraulic booster 13.

Figure 2:
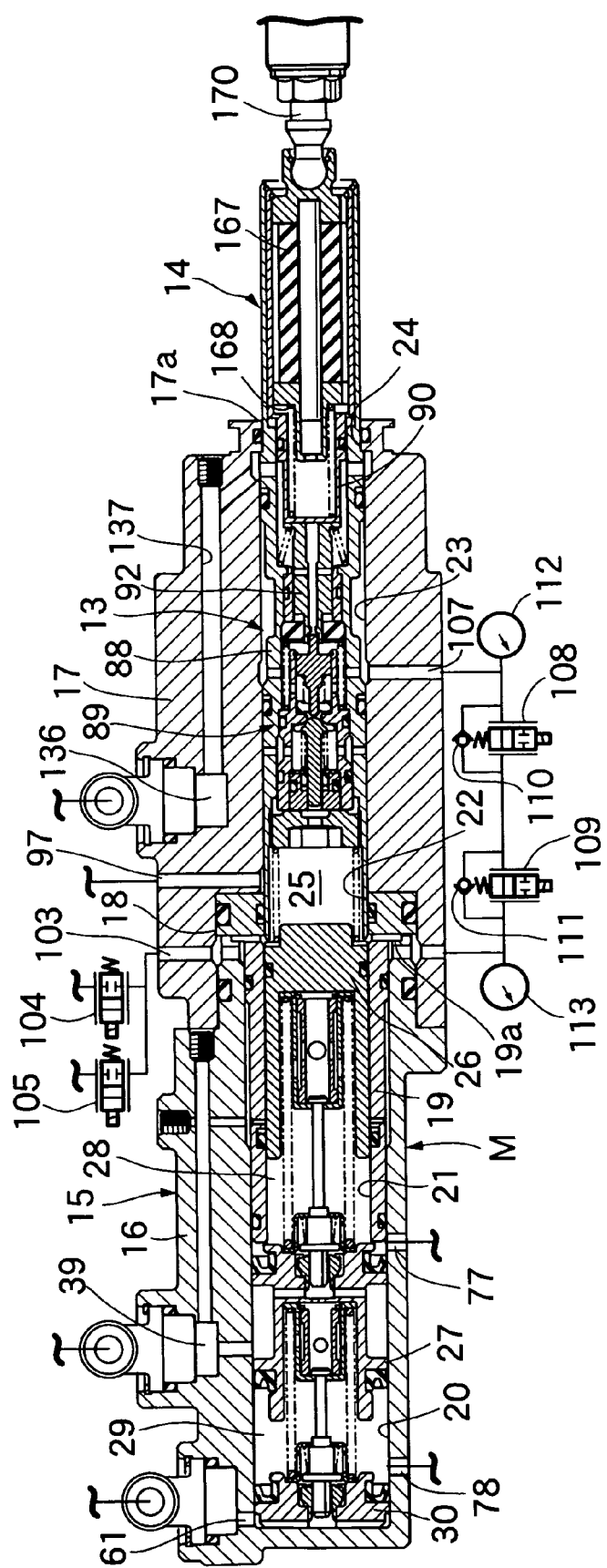
FIG. 2 is a longitudinal sectional view of a master cylinder, hydraulic booster, and brake stroke simulator.

Referring also to FIG. 2, a casing 15 common to the master cylinder M and hydraulic booster 13 houses a first cylinder body 16 of a bottomed cylindrical shape with its front end closed; a second cylinder body 17 which is cylindrical in shape, has an inward flange 17a on its rear end, and is coupled coaxially with the rear part of the first cylinder body 16; a ring-shaped separator 18 sandwiched between the first and second cylinder bodies 16 and 17; and a cylindrical sleeve 19 which is equipped with an outward flange 19a sandwiched between the separator 18 and the rear end of first cylinder body 16 on its rear end, and is inserted and fastened in the rear part of the first cylinder body 16.

The casing 15 is provided with a series of cylinder holes ranging concentrically in order from its front end: a first cylinder hole 20 formed by the front inner circumference of the first cylinder body 16, a second cylinder hole 21 formed by the inner circumference of the sleeve 19 and smaller in diameter than the first cylinder hole 20, a third cylinder hole 22 formed by the inner circumference of the separator 18 and slightly smaller in diameter than the second cylinder hole 21, a fourth cylinder hole 23 formed by the inner circumference of the second cylinder body 17 excluding the inward flange 17a and substantially equal in diameter to the second cylinder hole 21, and a fifth cylinder hole 24 formed by the inner circumference of the inward flange 17a of the second cylinder body 17 and smaller in diameter than the fourth cylinder hole 23.

Figure 3:
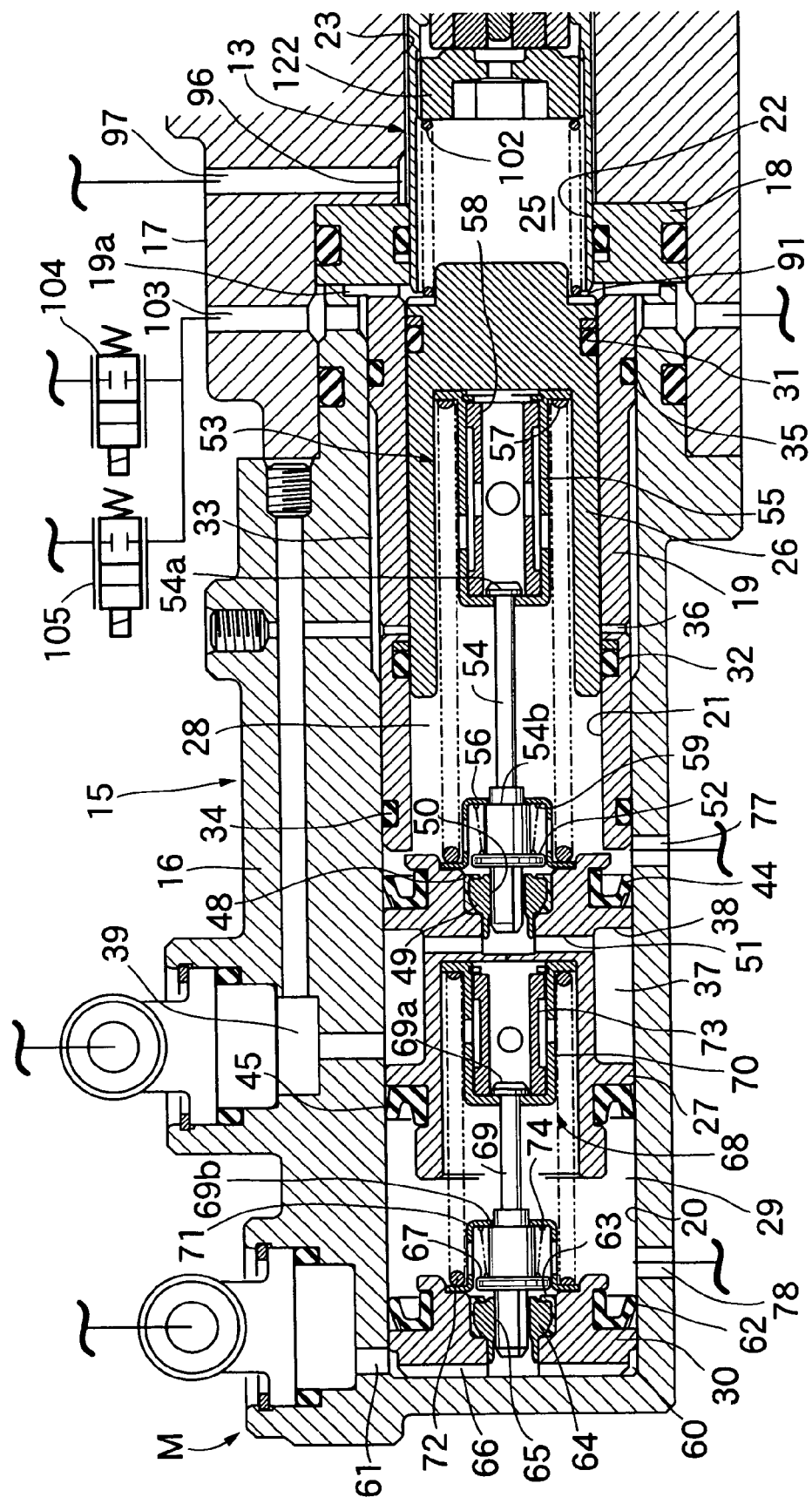
FIG. 3 is an enlarged longitudinal sectional view of the master cylinder.

Referring also to FIG. 3, in the master cylinder M, a rear master piston 26 spring-urged backward is slidably inserted into the second cylinder hole 21 in the casing 15 with its back turned to a boosted hydraulic pressure chamber 25, a front master piston 27 spring-urged backward and placed ahead of the rear master piston 26 is slidably inserted into the first cylinder hole 20 in the casing 15, a rear output hydraulic chamber 28 is formed between the rear master piston 26 and front master piston 27, and a front output hydraulic chamber 29 is formed between a disk-shaped seat supporting member 30 fitted liquid-tight in the front end of the casing 15—i.e., the front end of the first cylinder body 16—and the front master piston 27.

An annular piston-side sealing member 31 and sleeve-side sealing member 32, spaced axially, are interposed between the rear master piston 26 and the sleeve 19, where the rear master piston 26 has a bottomed cylindrical shape with its front end opened. The piston-side sealing member 31 is mounted on the rear outer circumference of the rear master piston 26, in sliding contact with the inner circumference of the second cylinder hole 21. The sleeve-side sealing member 32 is mounted on the inner circumference of the sleeve 19, in contact with the front outer circumference of the rear master piston 26 when the rear master piston 26 is at its fully retracted position.

An annular release chamber 33 is formed between the outer circumference of the sleeve 19 and first cylinder body 16. The opposite ends of the annular release chamber 33 in the axial direction are sealed with an annular sealing member 34 and annular sealing member 35, where the annular sealing member 34 is mounted on the front outer circumference of the sleeve 19 and placed resiliently in contact with the inner circumference of the first cylinder body 16 while the annular sealing member 35 is mounted on the rear outer circumference of the sleeve 19 and placed resiliently in contact with the inner circumference of the first cylinder body 16. Besides, the sleeve 19 has a plurality of communicating holes 36 provided between the sealing members 31 and 32 which in turn are interposed between the sleeve 19 and rear master piston 26. The communicating holes 36 are provided in such a manner that the part between the axially opposite ends sealed with the sealing members 31 and 32 out of the part between the inner circumference of the sleeve 19 and outer circumference of the rear master piston 26 is communicated with the annular release chamber 33.

An annular recess 38 which forms a rear annular chamber 37 in conjunction with the inner circumference of the first cylinder body 16 is provided on the outer circumference of the front master piston 27. A rear release port 39 communicated with the rear annular chamber 37 and the annular release chamber 33 is provided on the first cylinder body 16. The rear release port 39 is communicated with the second oil sump 42 among of the first, second, and third oil sumps 41, 42, and 43 formed independently of one another in a reservoir 40 as shown in FIG. 1.

On the outer circumference of the front master piston 27, a rear lip seal 44 is interposed between the rear output hydraulic chamber 28 and rear annular chamber 37 to allow brake fluid to flow from the rear annular chamber 37 to the rear output hydraulic chamber 28 so that the rear output hydraulic chamber 28 can be replenished with brake fluid while a front lip seal 45 is interposed between the front output hydraulic chamber 29 and rear annular chamber 37. Consequently, the second cylinder hole 21 formed by the inner circumference of the sleeve 19 is smaller in diameter than the first cylinder hole 20, and thus a seal diameter of the rear master piston 26 formed by the piston-side sealing member 31 and the sleeve-side sealing member 32 is smaller than a seal diameter of the front master piston 27 formed by the lip seals 44 and 45.

A valve hole forming member 49 is press-fitted in the center of the rear end of the front master piston 27, an annular seat member 48 made of rubber is baked onto the outer circumference of the valve hole forming member 49, and a plurality of communicating channels 51 are provided behind the front master piston 27 to communicate a valve hole 50 provided in the center of the valve hole forming member 49 with the rear annular chamber 37.

A disk-shaped valve disc 52 which can close the valve hole 50 when seated on the seat member 48 is installed near, and integrally with, the front end of a rod 54 which forms part of maximum distance limiting means 53 installed between the rear and front master pistons 26 and 27 to limit the maximum distance between the rear and front master pistons 26 and 27. The front end of the rod 54 is inserted into the valve hole 50 so as to allow passage of the brake fluid through the valve hole 50 when the valve disc 52 is lifted from the seat member 48.

The maximum distance limiting means 53 comprises a rear retainer 55 which is formed into a bottomed cylindrical shape with its front end closed and is abutted by the rear master piston 26, a front retainer 56 which is formed into a bottomed cylindrical shape with its rear end closed and is abutted by the rear end of the front master piston 27, a rear return spring 57 which is mounted under compression between the rear and front retainers 55 and 56 and urges the rear master piston 26 backward, and the rod 54 which movably penetrates the closed front end of the rear retainer 55 and closed rear end of the front retainer 56.

The rod 54 is equipped with an engagement flange 54a on its rear end and with an engagement shoulder 54b behind the valve disc 52, where the engagement flange 54a can be engaged with the closed front end of the rear retainer 55 from behind, and the engagement shoulder 54b can be engaged with the closed rear end of the front retainer 56 from ahead. A guide tube 58 is fitted and fastened in the rear retainer 55 to guide axial movement of the engagement flange 54a.

With the rear retainer 55 substantially fastened to the rear master piston 26 by spring force of the rear return spring 57, with the front retainer 56 substantially fastened to the front master piston 27 by spring force of the rear return spring 57, and with the rear master piston 26 located at its fully retracted position as shown in FIG. 3, the maximum distance limiting means 53 limits the maximum distance between the rear and front master pistons 26 and 27, as the engagement flange 54a is engaged with the closed front end of the rear retainer 55 from behind, and the engagement shoulder 54b is engaged with the closed rear end of the front retainer 56 from ahead. At this time, the valve disc 52 is lifted from the seat member 48 to open the valve hole 50.

Moreover, a valve spring 59 smaller in spring load than the rear return spring 57 is mounted under compression between the front retainer 56 and valve disc 52, and as the rear master piston 26 moves forward from its fully retracted position, the valve disc 52 is seated on the seat member 48 by spring force of the valve spring 59 to close the valve hole 50.

A front annular chamber 60 is formed between an inner surface of the front end of the first cylinder hole 20 and the seat supporting member 30, and a front release port 61 communicated with the front annular chamber 60 is provided on the front of the first cylinder body 16. The front release port 61 is communicated with the third oil sump 43 formed in the reservoir 40 as shown in FIG. 1. Moreover, a lip seal 62 is mounted on the outer circumference of the seat supporting member 30 and placed resiliently in contact with the inner circumference of the first cylinder body 16 to allow the brake fluid to flow from the front annular chamber 60 to the front output hydraulic chamber 29.

A valve hole forming member 64 is press-fitted in the center of the seat supporting member 30, an annular seat member 63 made of rubber is baked onto the outer circumference of the valve hole forming member 64, and a plurality of communicating grooves 66 are provided in front of the seat supporting member 30 to communicate a valve hole 65 provided in the center of the valve hole forming member 64 with the front annular chamber 60.

A disk-shaped valve disc 67 which can close the valve hole 65 when seated on the seat member 63 is provided near the front end of a rod 69 which forms part of maximum distance limiting means 68 installed between the seat supporting member 30 and front master piston 27, to limit the maximum distance between the seat supporting member 30 and front master piston 27. The front end of the rod 69 is inserted into the valve hole 65 so as to allow passage of the brake fluid through the valve hole 65 when the valve disc 67 is lifted from the seat member 63.

The maximum distance limiting means 68 comprises a rear retainer 70 which is formed into a bottomed cylindrical shape with its front end closed and is abutted by the front master piston 27, a front retainer 71 which is formed into a bottomed cylindrical shape with its rear end closed and is abutted by the rear end of the seat supporting member 30, a front return spring 72 which is mounted under compression between the rear and front retainers 70 and 71 and urges the front master piston 27 backward, and the rod 69 which movably penetrates the closed front end of the rear retainer 70 and closed rear end of the front retainer 71, where the front return spring 72 is smaller in spring load than the rear return spring 57.

The rod 69 is equipped with an engagement flange 69a on its rear end and with an engagement shoulder 69b behind the valve disc 67, where the engagement flange 69a can be engaged with the closed front end of the rear retainer 70 from behind, and the engagement shoulder 69b can be engaged with the closed rear end of the front retainer 71 from ahead. A guide tube 73 is fitted and fastened in the rear retainer 70 to guide axial movement of the engagement flange 69a.

With the rear retainer 70 substantially fastened to the front master piston 27 by spring force of the front return spring 72, with the front retainer 71 substantially fastened to the seat supporting member 30 by spring force of the front return spring 72, and with the front master piston 27 located at its fully retracted position as shown in FIG. 3, the maximum distance limiting means 68 limits the maximum distance between the seat supporting member 30 and front master piston 27, as the engagement flange 69a is engaged with the closed front end of the rear retainer 70 from behind, and the engagement shoulder 69b is engaged with the closed rear end of the front retainer 71 from ahead. At this time, the valve disc 67 is lifted from the seat member 63 to open the valve hole 65.

Moreover, a valve spring 74 smaller in spring load than the front return spring 72 is mounted under compression between the front retainer 71 and valve disc 67, and as the front master piston 27 moves forward from its fully retracted position, the valve disc 67 is seated on the seat member 63 by spring force of the valve spring 74 to close the valve hole 65.

The first cylinder body 16 is equipped with a rear output port 77 which outputs hydraulic pressure of the rear output hydraulic chamber 28 whose pressure is increased along with forward movement of the rear master piston 26, and with a front output port 78 which outputs hydraulic pressure of the front output hydraulic chamber 29 whose pressure is increased along with forward movement of the front master piston 27. Moreover, as shown in FIG. 1, the rear output port 77 is connected to right front BA and left rear wheel brakes BA and BB via a first hydraulic controller 79A, while the front output port 78 is connected to left front and right rear wheel brakes BC and BD via a second hydraulic controller 79B.

The first hydraulic controller 79A comprises a normally open solenoid valve 80A installed between the rear output port 77 and right front wheel brake BA, a normally open solenoid valve 80B installed between the rear output port 77 and left rear wheel brake BB, one-way valves 81A and 81B which allow passage of the brake fluid to the rear output port 77 and are connected in parallel with the normally open solenoid valves 80A and 80B, respectively, a normally closed solenoid valve 83A installed between the right front wheel brake BA and a first reservoir 82A, a normally closed solenoid valve 83B installed between the left rear wheel brake BB and first reservoir 82A, a first return pump 84A which returns the brake fluid pumped from the first reservoir 82A to the rear output port 77, and an orifice 85A provided between the first return pump 84A and rear output port 77.

The second hydraulic controller 79B comprises a normally open solenoid valve 80C installed between the front output port 78 and left front wheel brake BC, a normally open solenoid valve 80D installed between the front output port 78 and right rear wheel brake BD, one-way valves 81C and 81D which allow passage of the brake fluid to the front output port 78 and are connected in parallel with the normally open solenoid valves 80C and 80D, respectively, a normally closed solenoid valve 83C installed between the left front wheel brake BC and a second reservoir 82B, a normally closed solenoid valve 83D installed between the right rear wheel brake BD and second reservoir 82B, a second return pump 84B which returns the brake fluid pumped from the second reservoir 82B to the front output port 78, and an orifice 85B provided between the second return pump 84B and front output port 78.

The first and second return pumps 84A and 84B are connected commonly to a single electric motor 86, by which they are driven commonly.

The first and second hydraulic controllers 79A and 79B can freely control the brake fluid outputted from the rear and front output ports 77 and 78. Through hydraulic control, the first and second hydraulic controllers 79A and 79B can also perform antilock brake control during a braking operation, traction control in a non-braking situation, etc.

Figure 4:
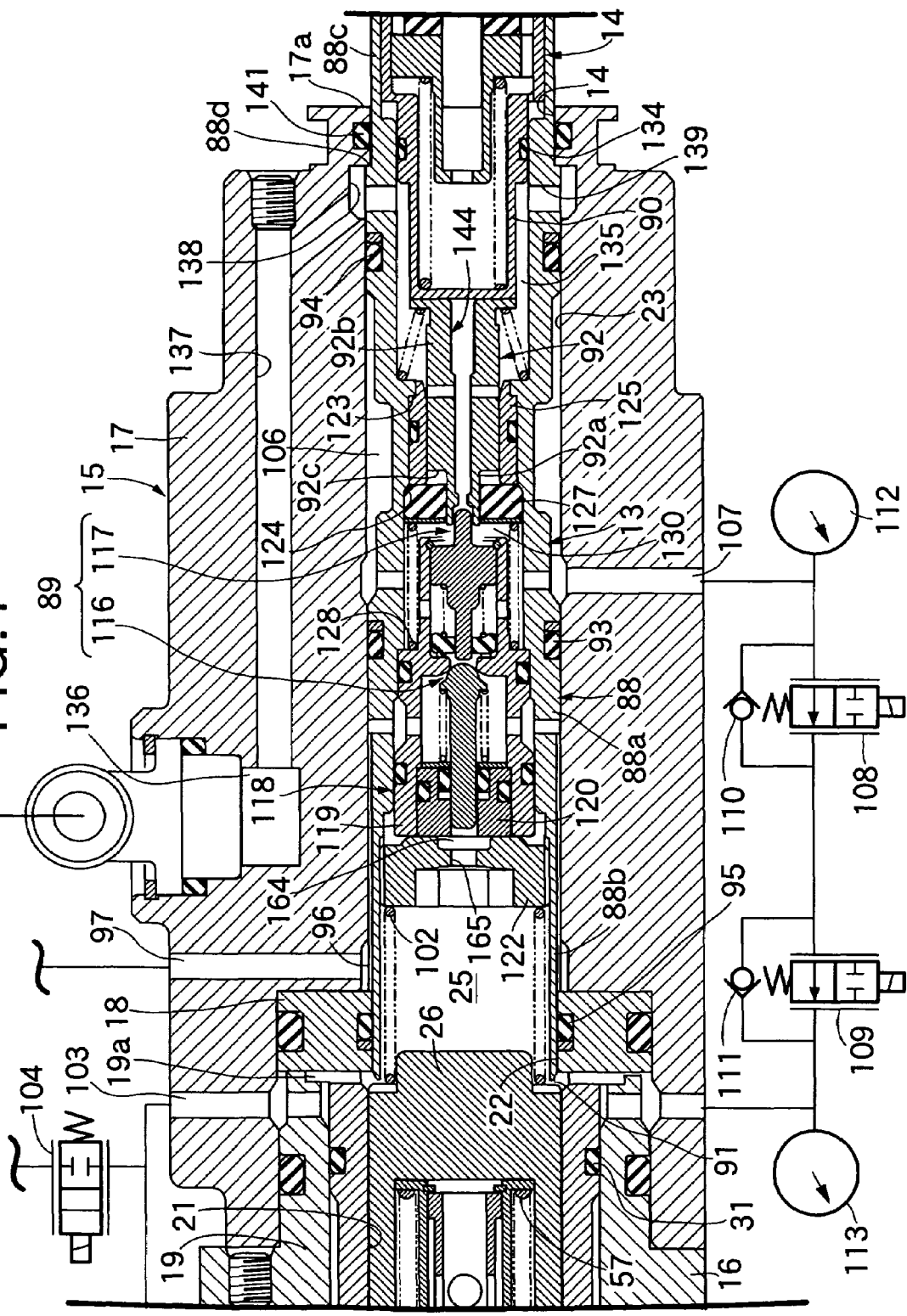
FIG. 4 is an enlarged longitudinal sectional view of the hydraulic booster.

Referring to FIG. 4, the hydraulic booster 13 comprises a backup piston 88 which has a stepped cylindrical shape and is slidably housed in the casing 15 with its face turned to the boosted hydraulic pressure chamber 25, a pressure regulating means 89 contained in the backup piston 88, a control piston 90 which makes the pressure regulating means 89 regulate pressure so as to achieve a balance between the reaction force generated by the hydraulic pressure of the boosted hydraulic pressure chamber 25 and the brake operating force inputted from the brake pedal 11 via the brake stroke simulator 14, and a reaction piston 92 placed between the pressure regulating means 89 and control piston 90.

The backup piston 88 integrally comprises a piston body 88a which slidably fits in the fourth cylinder hole 23, a cylindrical pusher 88b which is coaxially and integrally linked to the front end of the piston body 88a by slidably penetrating the third cylinder hole 22, and a cylindrical extension tube 88c which is coaxially and integrally linked to the rear end of the piston body 88a and extends beyond the casing 15 by slidably penetrating the fifth cylinder hole 24, where the pusher 88b can push the rear master piston 26 forwardly by directly abutting against the rear end of the rear master piston 26.

On the outer circumference of the backup piston 88, a limiting shoulder 88d is formed near the rear end between the piston body 88a and extension tube 88c. The limiting shoulder 88d defines the fully retracted position of the backup piston 88 within the casing 15 as it abuts the inward flange 17a at the rear end of the second cylinder body 17 in the casing 15 from ahead.

Annular sealing members 93 and 94, spaced axially, are mounted on the outer circumference of the piston body 88a of the backup piston 88, and placed resiliently in sliding contact with the inner circumference of the fourth cylinder hole 23. An annular sealing member 95 is mounted on the inner circumference of the separator 18, and placed resiliently in sliding contact with the outer circumference of the pusher 88b of the backup piston 88. Thus, the third cylinder hole 22 is slightly smaller in diameter than the second and fourth cylinder holes 21 and 23 which are substantially equal in diameter, and the pusher 88b, which has a seal diameter smaller than seal diameters of the rear master piston 26 and piston body 88a, fits slidably in the third cylinder hole 22 of the casing 15.

An annular input chamber 96 is formed between the second cylinder body 17 and backup piston 88 in the casing 15, and the axially opposite ends of the input chamber 96 is sealed by the annular sealing member 93, which is nearer to the front out of the two annular sealing members 93 and 94 mounted on the outer circumference of the piston body 88a, and by the annular sealing member 95 mounted on the inner circumference of the separator 18. The input chamber 96 is communicated with an input port 97 provided in the second cylinder body 17.

When the pusher 88b of the backup piston 88 pushes the rear master piston 26 of the master cylinder M forwardly, the boosted hydraulic pressure chamber 25 increases in volume and the input chamber 96 decreases in volume, where the volume increase of the boosted hydraulic pressure chamber 25 is substantially equal to the volume decrease of the input chamber 96.

The input port 97 is communicated with a hydraulic power source 12 as shown in FIG. 1. The hydraulic power source 12 comprises a hydraulic pump 98 which pumps the brake fluid from the first oil sump 41 of the reservoir 40, an accumulator 99 connected to a discharge port of the hydraulic pump 98, a relief valve 100 installed between the discharge port of the hydraulic pump 98 and first oil sump 41, and a hydraulic pressure sensor 101 which detects the hydraulic pressure of the accumulator 99 to control operation of the hydraulic pump 98. High-pressure brake fluid normally maintained at a constant pressure is supplied from the hydraulic power source 12 to the input port 97, and thus to the input chamber 96.

A spring 102 housed in the boosted hydraulic pressure chamber 25 is mounted as spring-urging means under compression between the backup piston 88 and rear master piston 26 whose fully retracted positions in the casing 15 are fixed. The spring force of the spring 102 urges the backup piston 88 and rear master piston 26 in such a direction as to separate them from each other.

Thus, in a non-braking state, the maximum distance limiting means 53 and 68 keep the distance between the closed front end of the casing 15 and rear master piston 26 within a predetermined maximum distance. In this state, a clearance 91 is formed between the rear master piston 26 and front end of the backup piston 88 at its fully retracted position so as to make the rear master piston 26 approach the backup piston 88 from ahead and oppose it. Thus, the spring 102 is smaller in spring load than the rear return spring 57 and front return spring 72. The spring 102 maintains the clearance 91 between the rear master piston 26 and backup piston 88 in a non-braking state.

As the output hydraulic pressure of the hydraulic power source 12 acts on the input chamber 96, hydraulic pressure acts in the retracting direction on the backup piston 88, while the spring force of the spring 102 also acts in the retracting direction on the backup piston 88. Preferably, the combined force of the hydraulic pressure in the retracting direction and the spring force of the spring 102 in the retracting direction is 300 to 1000 N.

In the casing 15, the second cylinder body 17, first cylinder body 16, and sleeve 19 are equipped with a boosted hydraulic pressure input port 103 which is communicated with the boosted hydraulic pressure chamber 25. As shown in FIG. 1, the boosted hydraulic pressure input port 103 is connected to the hydraulic power source 12 via a normally closed linear solenoid valve 104 for automatic brake pressurization, and to the first oil sump 41 of the reservoir 40 via a normally closed pressure-reducing linear solenoid valve 105 for regeneration and coordination. That is, the normally closed linear solenoid valve 104 for automatic brake pressurization is interposed between the boosted hydraulic pressure chamber 25 and hydraulic power source 12, while the normally closed pressure-reducing linear solenoid valve 105 for regeneration and coordination is interposed between the boosted hydraulic pressure chamber 25 and reservoir 40.

An annular output chamber 106 is formed between the piston body 88a of the backup piston 88 and second cylinder body 17 in the casing 15 in such a manner that its axially opposite ends are sealed by the pair of annular sealing members 93 and 94 mounted on the outer circumference of the piston body 88a. Also, a boosted hydraulic pressure output port 107 communicated with the output chamber 106 is provided in the second cylinder body 17.

The boosted hydraulic pressure output port 107 is connected to the boosted hydraulic pressure input port 103, via a normally open linear solenoid valve 108 for automatic brake depressurization and a normally open pressurizing linear solenoid valve 109 for regeneration and coordination which are connected in series. A first one-way valve 110 is connected in parallel to the normally open linear solenoid valve 108 for automatic brake depressurization, to allow the brake fluid to flow from the servo-hydraulic output port 107 to the boosted hydraulic pressure input port 103. Also, a second one-way valve 111 is connected in parallel to the pressurizing linear solenoid valve 109 for regeneration and coordination, to allow the brake fluid to flow from the boosted hydraulic pressure input port 103 to the boosted hydraulic pressure output port 107.

That is, the linear solenoid valve 108 for automatic brake depressurization connected in parallel to the first one-way valve 110 as well as the pressurizing linear solenoid valve 109 for regeneration and coordination connected in parallel to the second one-way valve 111 are interposed between the output chamber 106 and boosted hydraulic pressure chamber 25.

Moreover, a hydraulic pressure sensor 112 for detecting the amount of brake operation is connected between the boosted hydraulic pressure output port 107 and the linear solenoid valve 108 for automatic brake depressurization, while a hydraulic pressure sensor 113 for automatic brake feedback control is connected between the pressurizing linear solenoid valve 109 for regeneration and coordination and the boosted hydraulic pressure input port 103.

Figure 5:
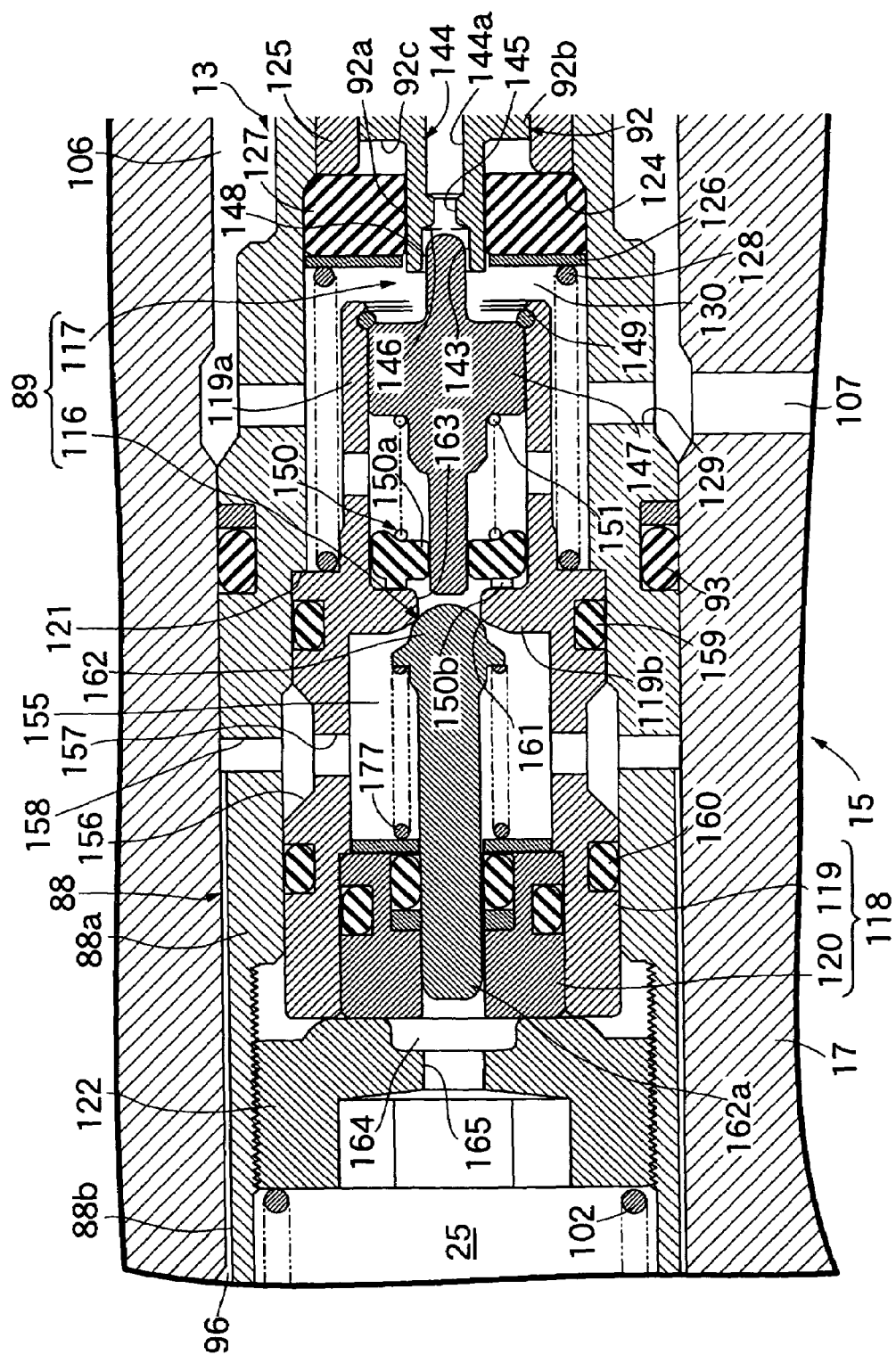
FIG. 5 is an enlarged view of a main part of FIG. 4.

Referring also to FIG. 5, the pressure regulating means 89 consists of a booster valve 116 and pressure-reducing valve 117. The pressure regulating means 89 is contained in the piston body 88a of the backup piston 88, and can provide communication between the input chamber 96 and the output chamber 106, and between the first oil sump 41 of the reservoir 40 and the output chamber 106, when the output hydraulic pressure of the hydraulic power source 12 decreases.

A valve housing 118 consisting of a housing body 119 with a stepped cylindrical shape and an end wall member 120 fitted and fastened liquid-tight in the front end of the housing body 119, is coaxially fitted and fastened in the piston body 88a of the backup piston 88. An annular shoulder 121 which faces the master cylinder M is provided in an inner surface of the piston body 88a. The valve housing 118 is fitted in the piston body 88a from ahead until it abuts the shoulder 121. A disk-shaped presser member 122 which sandwiches the valve housing 118 between itself and the shoulder 121 is screwed into the piston body 88a of the backup piston 88. The spring 102 housed in the boosted hydraulic pressure chamber 25 is mounted under compression between the rear master piston 26 of the master cylinder M and the presser member 122.

Beyond the valve housing 118, an engagement shoulder 123 (see FIG. 4) facing the valve housing 118 as well as an annular engagement shoulder 124 placed between the engagement shoulder 123 and valve housing 118 and facing the valve housing 118 are provided on an inner surface of the piston body 88a of the backup piston 88. The engagement shoulder 123 is abutted by, and engaged with, the outer circumference of the rear end of a cylindrical sleeve 125 fitted liquid-tight in the piston body 88a. The front end of the sleeve 125 is placed flush with the annular engagement shoulder 124.

The front ends of the engagement shoulder 124 and sleeve 125 are abutted by the outer part of the rear face of an annular elastic member 127 whose front face is in contact with a plate retainer 126. Also, a presser bar spring 128 is mounted under compression between the valve housing 118 and the front face of the retainer 126. Consequently, the faces of the elastic member 127 are held between the front ends of the engagement shoulder 124 and sleeve 125, and the rear face of the retainer 126.

In the piston body 88a of the backup piston 88, a boosted hydraulic pressure control chamber 130 is formed between the valve housing 118 and the retainer 126 in contact with the elastic member 127, to exert hydraulic pressure on a surface of the elastic member 127. The boosted hydraulic pressure control chamber 130 is communicated with the output chamber 106 via a plurality of communicating holes 129 provided in the piston body 88a.

Figure 6:
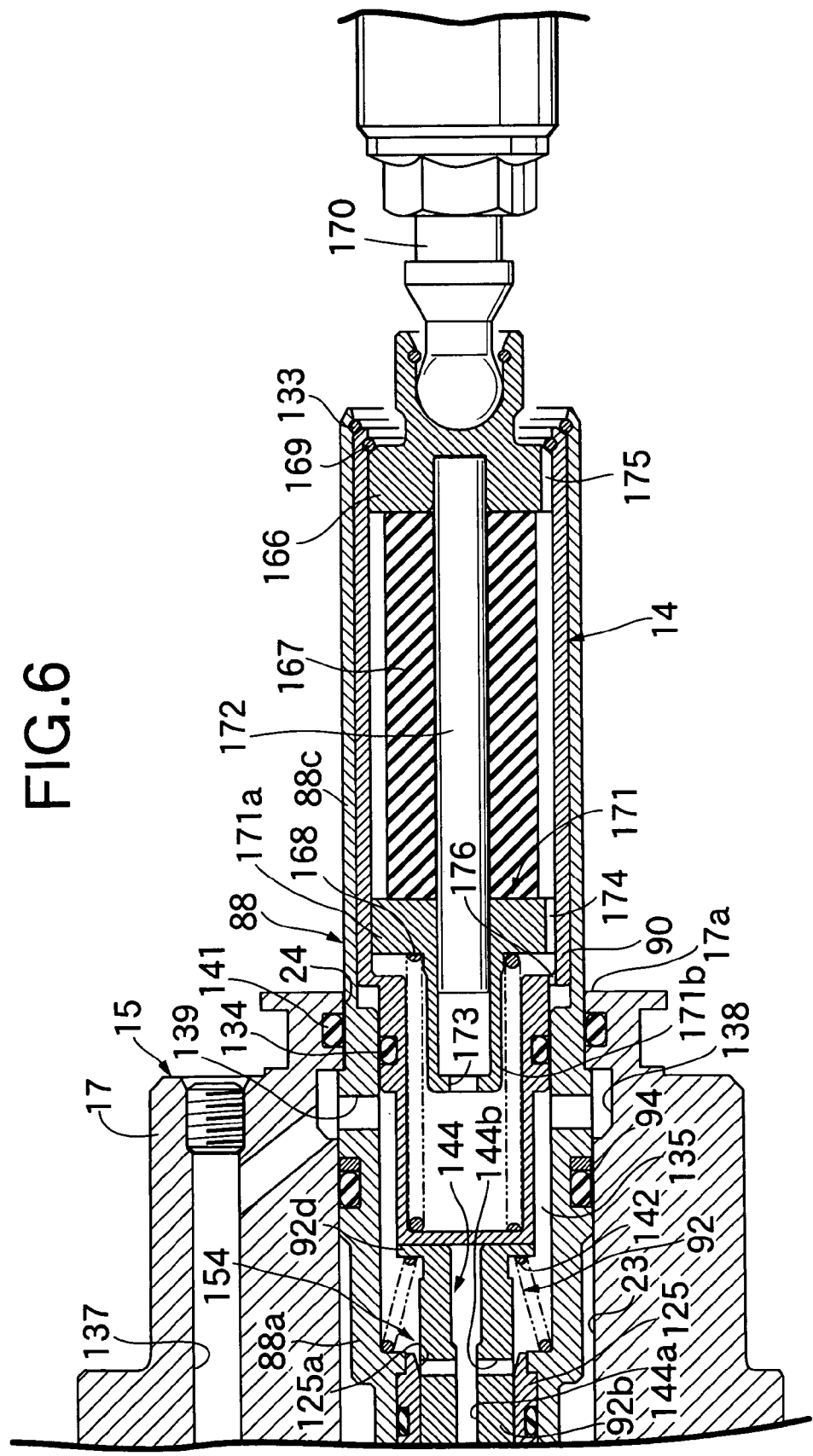
FIG. 6 is an enlarged longitudinal sectional view of the brake stroke simulator.

Referring also to FIG. 6, the control piston 90 is formed as a stepped closed-end tube with its front end closed, and is relatively slidably fitted in the rear parts of the extension tube 88c and piston body 88a of the backup piston 88. A snap ring 133 is fitted in the rear end of the extension tube 88c of the backup piston 88 to abut against the rear end of the control piston 90, thereby preventing the control piston 90 from coming off from the backup piston 88.

An annular sealing member 134 which comes into resilient contact with the rear inner circumference of the piston body 88a of the backup piston 88 is mounted on the front outer circumference of the control piston 90. In the rear part of the piston body 88a, a release chamber 135 which is sealed from outside by the sealing member 134 is formed to face the front end of the control piston 90. On the other hand, in the second cylinder body 17 in the casing 15, there are provided a release port 136 communicated with the first oil sump 41 of the reservoir 40 and a release channel 137 communicated with the release port 136, as well as an annular recess 138 which opens to an inner surface of the fourth cylinder hole 23 so as to be communicated with the release channel 137. Moreover, the backup piston 88 is equipped with a plurality of communicating holes 139 to ordinarily keep the release chamber 135 communicated with the annular recess 138. The annular recess 138 is sealed both from ahead and behind by the annular sealing member 94 mounted on the outer circumference of the backup piston 88 and an annular sealing member 141 mounted on an inner surface of the fifth cylinder hole 24 ahead of the annular recess 138 and placed in sliding contact with the outer circumference of the extension tube 88c of the backup piston 88. Consequently, the release chamber 135 is ordinarily kept communicated with the first oil sump 41 of the reservoir 40.

The reaction piston 92 integrally comprises a small-diameter piston portion 92a whose front end faces the boosted hydraulic pressure control chamber 130 and a large-diameter piston portion 92b coaxially extending to the rear end of the small-diameter piston portion 92a by forming an annular shoulder 92c, which faces the boosted hydraulic pressure control chamber 130, between itself and the small-diameter piston portion 92a. The small-diameter piston portion 92a liquid-tightly and slidably penetrates the elastic member 127 and axially slidably penetrates the retainer 126, while the large-diameter piston portion 92b is slidably fitted in the sleeve 125.

When the hydraulic pressure of the boosted hydraulic pressure control chamber 130 which acts on the front face of the elastic member 127 reaches a predetermined value, the inner periphery of the rear face of the elastic member 127, normally placed to face the annular shoulder 92c, is deformed and pressed against the annular shoulder 92c of the reaction piston 92.

The rear end of the reaction piston 92 coaxially abuts the front end of the control piston 90. A spring 142 whose spring force causes the reaction piston 92 to abut against the front end of the control piston 90 is mounted under compression between a flange 92d provided on the rear end of the reaction piston 92, and the backup piston 88. The spring 142 provides small spring load only enough to cause the control piston 90 to follow the reaction piston 92.

The reaction piston 92 is equipped with an insertion hole 143 which has a front end communicated with the boosted hydraulic pressure control chamber 130 and extends coaxially with the boosted hydraulic pressure control chamber 130, and a through-hole 144 having a shaft hole 144a coaxial with the insertion hole 143 and communicated with the release chamber 135. A flange-shaped pressure-reducing valve seat 146 sticks out radially inward between the insertion hole 143 and shaft hole 144a, to form a pressure-reducing valve hole 145 coaxial with the insertion hole 143 and through-hole 144.

The pressure-reducing valve 117 is composed of the pressure-reducing valve seat 146 and a poppet-type pressure-reducing valve disc 147 which is placed ahead of the reaction piston 92 to allow its rear end to be seated on the valve seat 146 and which is spring-urged backward to the backward limit. The rear part of the pressure-reducing valve disc 147 is inserted coaxially into the insertion hole 143 to form an annular orifice 148 in front of the pressure-reducing valve seat 146 in conjunction with the reaction piston 92.

At the rear of the housing body 119 of the valve housing 118, a cylindrical guide tube 119a is mounted integrally with the housing body 119 to extend backward in the boosted hydraulic pressure control chamber 130. The pressure-reducing valve disc 147 housed in the boosted hydraulic pressure control chamber 130 is held axially slidably by the guide tube 119a in the boosted hydraulic pressure control chamber 130.

A snap ring 149 is mounted on the rear end of the guide tube 119a to set the backward limit of the pressure-reducing valve disc 147 by abutting against the pressure-reducing valve disc 147 from behind. Also, a baffling member 150 axially movably penetrated by the front part of the pressure-reducing valve disc 147 is housed in the guide tube 119a, forming a front end wall of the guide tube 119a and abutting against an inward flange 119b provided on the housing body 119 of the valve housing 118. Besides, a pressure-reducing valve spring 151 which urge the pressure-reducing valve disc 147 backward is mounted under compression between the baffling member 150 and pressure-reducing valve disc 147.

A variable throttle mechanism 154 is provided between the reaction piston 92 and the sleeve 125 whose rear end faces the release chamber 135. The variable throttle mechanism 154 causes the brake fluid to pass through the through-hole 144 to the release chamber 135 at full throttle when the brake pedal 11 and thus the reaction piston 92 are inoperative in a non-operating state, but limits the passage of the brake fluid through the through-hole 144 to the release chamber 135 when the reaction piston 92 is operated via the brake pedal 11.

The through-hole 144 is composed of the shaft hole 144a and a plurality of caves 144b, where the shaft hole 144a is provided in the reaction piston 92 with its front end communicated with the pressure-reducing valve hole 145 and its rear end closed at the front end of the control piston 90, while the caves 144b extend to the middle part of the shaft hole 144a and open to an outer surface of the reaction piston 92. The variable throttle mechanism 154 is composed of the rear end of the sleeve 125 and the caves 144b.

A tapered expanded diameter portion 125a which widens toward the open end is formed in the inner circumference of the rear end of the sleeve 125.

In the valve housing 118, a valve chamber 155 is formed between the inward flange 119b and end wall member 120. Also, an annular recess 156 is provided in the outer circumference of the housing body 119 of the valve housing 118.

The housing body 119 is equipped with a plurality of communicating holes 157 to communicate the valve chamber 155 with the annular recess 156. Also, the piston body 88a of the backup piston 88 is equipped with a plurality of communicating channels 158 which extend in the radial direction of the second cylinder body 17 with their inner ends communicated with the annular recess 156 and with their outer ends communicated with the input chamber 96, making the valve chamber 155 communicated with the hydraulic power source 12. Moreover, a pair of annular sealing members 159 and 160 which sandwich the annular recess 156 are mounted on the outer circumference of the housing body 119 of the valve housing 118, and placed resiliently in contact with the inner circumference of the piston body 88a.

The booster valve 116 comprises a booster valve seat 161 formed by the outer circumference of the inward flange 119b of the valve housing 118 and facing the valve chamber 155 and a poppet-type booster valve disc 162 which is housed in the valve chamber 155 and can be seated on the booster valve seat 161. The booster valve seat 161 forms a booster valve hole 163 which allows the front end of the pressure-reducing valve disc 147 to pass through. The booster valve disc 162 is housed in the valve chamber 155, being urged backward by a valve spring 177 mounted under compression between the booster valve disc 162 and valve housing 118, but it can be pushed forward by the front end of the pressure-reducing valve disc 147 which passes through the booster valve hole 163.

The booster valve disc 162 integrally comprises a rod 162a which liquid-tightly and axially movably penetrates the middle part of the end wall member 120 of the valve housing 118. The front end of the rod 162a faces a hydraulic chamber 164 formed between the end wall member 120 and presser member 122. The presser member 122 is equipped with a communicating hole 165 which communicates the hydraulic chamber 164 with the boosted hydraulic pressure chamber 25, causing the hydraulic pressure of the boosted hydraulic pressure chamber 25 to act rearward on the front end of the booster valve disc 162. The pressure receiving area on the front end of the booster valve disc 162 subjected to the hydraulic pressure of the boosted hydraulic pressure chamber 25 is set substantially equal to the sealing area obtained when the booster valve disc 162 is seated on the booster valve seat 161. That is, the diameter of the rod 162a is set substantially equal to the diameter of that part of the booster valve seat 161 on which the booster valve disc 162 is seated.

When the booster valve 116 is open, the brake fluid in the valve chamber 155 communicated with the hydraulic power source 12 flows into the boosted hydraulic pressure control chamber 130 through the booster valve hole 163. The baffling member 150 is placed near the booster valve hole 163 in the boosted hydraulic pressure control chamber 130. The baffling member 150 is axially movably penetrated by the pressure-reducing valve disc 147 and urged by the pressure-reducing valve spring 151 so as to be placed in contact with the inward flange 119b.

The baffling member 150 comprises a disk 150a placed to face the inward flange 119b with its center axially movably penetrated by the pressure-reducing valve disc 147, and a plurality of protrusions 150b sticking out from the disk 150a so as to abut against the inward flange 119b. The brake fluid flowing into the boosted hydraulic pressure control chamber 130 through the booster valve hole 163 changes flow direction upon hitting the disk 150a, is baffled so as to flow radially between the disk 150a and inward flange 119b, and flows into the boosted hydraulic pressure control chamber 130.

In the hydraulic booster 13, as brake operating input from the brake pedal 11 is entered the control piston 90 via the brake stroke simulator 14, a pressing force of the control piston 90 acts forward on the reaction piston 92. Consequently, the reaction piston 92 moves forward, causing the pressure-reducing valve disc 147 to be seated on the pressure-reducing valve seat 146. As a result, the pressure-reducing valve 117 closes, to block the boosted hydraulic pressure control chamber 130 from the reservoir 40. Then, when the control piston 90, reaction piston 92, and pressure-reducing valve disc 147 advance further, the booster valve disc 162 is lifted from the booster valve seat 161, opening the booster valve 116, and thus causing output hydraulic pressure of the hydraulic power source 12 to act on the boosted hydraulic pressure control chamber 130. When the pressure-reducing valve 117 remains closed, the hydraulic pressure of the boosted hydraulic pressure control chamber 130, i.e., the boosted hydraulic pressure chamber 25, is acting on the front part of the reaction piston 92, the reaction piston 92 and control piston 90 retract to achieve a balance between the brake operating input from the brake pedal 11 and hydraulic force produced by the hydraulic pressure of the boosted hydraulic pressure control chamber 130. Consequently, the pressure-reducing valve 117 opens and the booster valve 116 closes. As the booster valve 116 and pressure-reducing valve 117 repeat opening and closing, the output hydraulic pressure of the hydraulic power source 12 is regulated to be a boosted hydraulic pressure corresponding to the brake operating input from the brake pedal 11, and is applied to the boosted hydraulic pressure control chamber 130, and thus to the boosted hydraulic pressure chamber 25.

The brake stroke simulator 14 comprises an input piston 166 which is an input member axially slidably housed in the control piston 90, as well as an elastic body 167 and coil spring 168 interposed in series between the input piston 166 and control piston 90. The brake stroke simulator 14 is housed in the control piston 90, and opens the control piston 90 to the atmosphere.

The input piston 166 is slidably fitted in the rear part of the control piston 90 with its fully retracted position defined by a snap ring 169 mounted on the rear end of the control piston 90, and is connected swingably with the front end of an input rod 170 linked to the brake pedal 11. Thus, a brake operating force corresponding to the operation of the brake pedal 11 is inputted into the input piston 166 via the input rod 170, and the input piston 166 moves forward according to the brake operating force.

The elastic body 167 is made of elastic material such as rubber and has a cylindrical shape. The elastic body 167 and metallic coil spring 168 smaller in spring load than the elastic body 167 are interposed in series between the input piston 166 and control piston 90 via an intermediate transmitting member 171 which comprises a disk 171a slidably fitted in the control piston 90 and a bottomed cylindrical portion 171b extending into the coil spring 168 and integrally joined with the disk 171a.

The rear part of a guide shaft 172 is coaxially press-fitted and fastened in the center of the input piston 166. The front part of the guide shaft 172 axially movably penetrates the center of the disk 171a of the intermediate transmitting member 171, and slidably fitted in the bottomed cylindrical portion 171b of the intermediate transmitting member 171.

The elastic body 167 is interposed between the disk 171a of the intermediate transmitting member 171 and input piston 166, being restricted from bending inward by being fitted with the guide shaft 172. The elastic body 167 can come into resilient contact with the inner circumference of the control piston 90 by expanding its diameter under an axial compressive force produced by forward movement of the input piston 166.

The coil spring 168 is installed between the disk 171a of the intermediate transmitting member 171 and the closed front end of the control piston 90. When the input piston 166 is at the backward limit, the coil spring 168 is slightly compressed compared to its natural state in which no external load is applied to it. That is, the elastic body 167 is preloaded with the coil spring 168.

A hole 173 is provided in the closed front end of the bottomed cylindrical portion 171b of the intermediate transmitting member 171 to prevent the pressure inside the bottomed cylindrical portion 171b from increasing or decreasing along with forward and backward movements of the guide shaft 172. Also, to open the control piston 90 to the atmosphere, a release groove 174 is provided in the outer circumference of the disk 171a of the intermediate transmitting member 171, and a release groove 175 is provided in the outer circumference of the input piston 166. Furthermore, behind the sealing member 134 which is mounted on the outer circumference of the control piston 90 and placed in sliding contact with the inner circumference of the extension tube 88c of the backup piston 88, a slit 176 is provided in the control piston 90 to eliminate any sealed space between the control piston 90 and backup piston 88.

Next, operation of the first embodiment will be described. The tandem master cylinder M comprises the rear master piston 26 and front master piston 27 slidably housed in the casing 15, where the rear master piston 26 has its back turned to the boosted hydraulic pressure chamber 25, while the front master piston 27 forms the rear output hydraulic chamber 28 in conjunction with the rear master piston 26, and has its front face facing the front output hydraulic chamber 29. Also, the casing 15 slidably houses the backup piston 88 whose front face faces the boosted hydraulic pressure chamber 25, whose backward limit is fixed, and which is ready to push the rear master piston 26 directly from behind in response to operation of the brake pedal 11 when the hydraulic pressure of the boosted hydraulic pressure chamber 25 decreases. The hydraulic pressure of the boosted hydraulic pressure chamber 25 results from the output hydraulic pressure of the hydraulic power source 12 regulated by the hydraulic booster 13 according to brake operation via the brake pedal 11. The seal diameter of the rear master piston 26 on the casing 15 is set smaller than the seal diameter of the front master piston 27 on the casing 15.

Thus, the amount of volume change in the rear output hydraulic chamber 28 per stroke of the rear master piston 26 can be set to a relatively large value. Consequently, when pushing the rear master piston 26 directly by the backup piston 88 in response to decrease in the hydraulic pressure of the boosted hydraulic pressure chamber 25, it is possible to relatively increase the amount of operation of the brake pedal 11, i.e., the amount of change in the hydraulic pressure of the rear output hydraulic chamber 28 per stroke of the backup piston 88 and the rear master piston 26, thus increasing braking efficiency.

The backup piston 88 comprises the piston body 88a and pusher 88b, where the piston body 88a is slidably fitted in the casing 15 with substantially the same seal diameter as the seal diameter of the rear master piston 26, while the pusher 88b is slidably fitted in the casing 15 with a smaller seal diameter than the seal diameters of the rear master piston 26 and piston body 88*a* and coaxially extends to the front end of the piston body 88*a*, being ready to abut against and push the rear end of the rear master piston 26. The backup piston 88 also contains the pressure regulating means 89 formed between the backup piston 88 and casing 15 so as to communicate the hydraulic power source 12 with the axially opposite ends of the annular input chamber 96 sealed by the sealing members 93 and 95 which are interposed between the piston body 88*a* and casing 15 and between the pusher 88*b* and casing 15, respectively. Also, the pressure regulating means 89 forms part of the hydraulic booster 13, being interposed between the input chamber 96 and output chamber 106 so as to communicate the input chamber 96 with the output chamber 106 connected to the boosted hydraulic pressure chamber 25 and to communicate the output chamber 106 with the reservoir 40 when the output hydraulic pressure of the hydraulic power source 12 decreases. Consequently, when the pusher 88*b* pushes the rear master piston 26 forward, the amount of volume increase in the boosted hydraulic pressure chamber 25 is set to be substantially equal to the amount of volume decrease in the input chamber 96.

Since reduction in the hydraulic pressure of the input chamber 96, i.e., reduction in the hydraulic pressure of the hydraulic power source 12, causes reduction in the hydraulic force which presses the backup piston 88 toward the backward limit, it is possible to advance the backup piston 88 according to operation of the brake pedal 11, abut against the pusher 88*b* in the front part of the backup piston 88 against the rear master piston 26 with a clearance provided between the casing 15 and inner contact surface of the rear master piston 26, advance the rear master piston 26 in this state, thereby outputting the boosted brake fluid from the master cylinder M. When the backup piston 88 and rear master piston 26 move forward in this way, there is no increase in the hydraulic pressure of the boosted hydraulic pressure chamber 25, because the piston body 88*a* of the backup piston 88 is substantially equal in seal diameter to the rear master piston 26, because the amount of volume increase in the boosted hydraulic pressure chamber 25 is substantially equal to the amount of volume decrease in the input chamber 96 when the pusher 88*b* of the backup piston 88 pushes the rear master piston 26 in the forward direction, and because the boosted hydraulic pressure chamber 25 is communicated with the input chamber 96 via the pressure regulating means 89. This makes it possible to avoid increase in the hydraulic pressure of the boosted hydraulic pressure chamber 25 during forward movement of the backup piston 88 using a simple configuration with a reduced number of parts.

Also, since the spring 102 which urges the backup piston 88 and rear master piston 26 in a direction to separate them from each other is installed between the two pistons 88 and 26 whose fully retracted positions in the casing 15 are limited, it is possible to ensure an idle stroke according to reduction in the hydraulic pressure of the hydraulic power source 12 when advancing the backup piston 88 with the brake pedal 11.

Since the combined force of backward hydraulic pressure which acts on the backup piston 88 as the output hydraulic pressure of the hydraulic power source 12 acts on the input chamber 96 and the urging force of the spring 102 which urges the backup piston 88 in the backward direction is set to 300 to 1000 N, the backup piston 88 can be held stably at its fully retracted position when the hydraulic power source 12 is operating properly. That is, by urging the backup piston in the backward direction with a force of 300 N or more, it is possible to urge the backup piston 88 reliably in the backward direction taking into consideration the output hydraulic pressure of the hydraulic power source 12 and sliding resistance of the backup piston 88. Also, by urging the backup piston 88 in the backward direction with a force of not more than 1000 N, it is possible to prevent the rear master piston 26 from being pushed fully into the master cylinder M.

Incidentally, the normally closed linear solenoid valve 104 for automatic brake pressurization is interposed between the hydraulic power source 12 and the boosted hydraulic pressure chamber 25, while the normally open linear solenoid valve 108 for automatic brake depressurization and first one-way valve 110 are interposed between the output chamber 106 and boosted hydraulic pressure chamber 25, where the first one-way valve 110 is connected in parallel to the linear solenoid valve 108 for automatic brake depressurization to allow the brake fluid to flow from the output chamber 106 to the boosted hydraulic pressure chamber 25. Even when the brake pedal 11 is not operated and thus the pressure regulating means 89 is not operating, it is possible to perform automatic brake control in which the brake fluid is caused to act on the wheel brakes BA to BD in a non-braking situation by opening and closing the linear solenoid valve 104 for automatic brake pressurization and the linear solenoid valve 108 for automatic brake depressurization, thereby regulating the hydraulic pressure of the boosted hydraulic pressure chamber 25. Moreover, when the linear solenoid valve 108 for automatic brake depressurization is closed in automatic braking mode, it is possible to activate the pressure regulating means 89 by operating the brake pedal 11. Thus, if hydraulic pressure higher than that of the boosted hydraulic pressure chamber 25 is generated in the output chamber 106, the hydraulic pressure of the output chamber 106 can be caused to act on the boosted hydraulic pressure chamber 25 via the first one-way valve 110, to thereby operate the master cylinder M as during normal braking operations.

The normally closed pressure-reducing linear solenoid valve 105 for regeneration and coordination is interposed between the boosted hydraulic pressure chamber 25 and reservoir 40, while the normally open pressurizing linear solenoid valve 109 for regeneration and coordination and second one-way valve 111 are interposed between the output chamber 106 and boosted hydraulic pressure chamber 25, where the second one-way valve 111 is connected in parallel to the pressurizing linear solenoid valve 109 for regeneration and coordination to allow the brake fluid to flow from the boosted hydraulic pressure chamber 25 to the output chamber 106. Thus, during regeneration in a braking operation, by opening and closing the pressurizing linear solenoid valve 109 for regeneration and coordination and the pressure-reducing linear solenoid valve 105 for regeneration and coordination and thereby regulating the hydraulic pressure of the boosted hydraulic pressure chamber 25, it is possible to output brake hydraulic pressure from the master cylinder M in a state offset from that during a normal braking operation. By returning the brake pedal 11 with the pressurizing linear solenoid valve 109 for regeneration and coordination closed, it is possible to release the hydraulic pressure of the boosted hydraulic pressure chamber 25 to the reservoir 40 via the second one-way valve 111.

The casing 15 comprises the first cylinder body 16 into which the front master piston 27 fits slidably and the cylindrical sleeve 19 which is fitted and fastened in the first cylinder body 16 with the rear master piston 26 slidably fitted in it. Also, the sleeve 19 forms the annular release chamber 33 between itself and the first cylinder body 16, where the annular release chamber 33 is communicated with the reservoir 40. The annular piston-side sealing member 31 and sleeve-side sealing member 32, spaced axially, are interposed between the sleeve 19 and the rear master piston 26 which is slidably fitted in the sleeve 19. The communicating holes 36 are provided in the sleeve 19 so that the part between the axially opposite ends sealed with the sealing members 31 and 32 out of the part between the inner circumference of the sleeve 19 and outer circumference of the rear master piston 26 is communicated with the annular release chamber 33.

If the piston-side sealing member 31 fails to perform its sealing function, where the piston-side sealing member 31 is the one closer to the boosted hydraulic pressure chamber 25 out of the pair of sealing members 31 and 32 interposed between the sleeve 19 which forms part of the casing 15 and the rear master piston 26, the brake fluid in the boosted hydraulic pressure chamber 25 is returned to the reservoir 40, passing between the rear master piston 26 and sleeve 19 as well as between the communicating holes 36 and annular release chamber 33. In this process, the boosted hydraulic pressure becomes unavailable because the backup piston 88 directly pushes the rear master piston 26 in response to decrease in the hydraulic pressure of the boosted hydraulic pressure chamber 25, but two brake hydraulic systems connected to the tandem master cylinder M operate the wheel brakes BA to BD.

If the sleeve-side sealing member 32 closer to the rear output hydraulic chamber 28 out of the pair of sealing members 31 and 32 fails to perform its sealing function, the brake fluid in the rear output hydraulic chamber 28 is returned to the reservoir 40, passing between the rear master piston 26 and sleeve 19, as well as the communicating holes 36 and annular release chamber 33. In this case, brake hydraulic pressure is not available to the wheel brakes BA and BB of the brake hydraulic system connected to the rear output hydraulic chamber 28, but as the hydraulic pressure of the boosted hydraulic pressure chamber 25 acts on the rear master piston 26, the front master piston 27 can be operated with boosted pressure, and the brake hydraulic pressure boosted by the brake hydraulic system connected to the front output hydraulic chamber 29 can be applied to the wheel brakes BC and BD.

Thus, if one of the pair of sealing members 31 and 32 interposed between the sleeve 19 and rear master piston 26 fails to function, the wheel brakes BA to BD change their operating condition, to thereby clearly detect which of the sealing members 31 and 32 is damaged.

Also, since the piston-side sealing member 31, one of the sealing members 31 and 32, is mounted on the rear outer circumference of the rear master piston 26 while the other sealing member, i.e., the sleeve-side sealing member 32, is mounted on the inner circumference of the sleeve 19 so as to come into contact with the front outer circumference of the rear master piston 26 located at its fully retracted position, the pair of sealing members 31 and 32 can be interposed between the rear master piston 26 and sleeve 19 while avoiding increase in the axial length of the sleeve 19 and thus increase in the axial length of the casing 15 regardless of the stroke of the rear master piston 26.

Furthermore, in a non-braking situation, the rear master piston 26 is urged backward by the rear return spring 57 with its distance from the closed front end of the casing 15 kept to a predetermined maximum distance by the maximum distance limiting means 53 and 68. In this state, the clearance 91 is formed between the rear end of the rear master piston 26 and front end of the backup piston 88 at its fully retracted position so as to make the rear master piston 26 approach the backup piston 88 from ahead and oppose it. This clearance 91 can absorb axial deviations of the master cylinder M and backup piston 88, to thereby avoid compressing the front return spring 74 which urges the front master piston 27 backward and the rear return spring 57 which urges the rear master piston 26 backward in excess of their set loads, and thus avoid increasing an idle stroke of the brake pedal 11.

Moreover, since the spring 102 smaller in spring load than the rear return spring 57 is mounted under compression between the backup piston 88 and rear master piston 26 so as to urge the rear master piston 26 forward, it is possible to maintain the clearance 91 between the rear master piston 26 and backup piston 88 while keeping the rear and front master pistons 26 and 27 from moving in a direction to abut against the backup piston 88 when the brake pedal 11 is not operated.

The hydraulic booster 13 comprises the backup piston 88, the pressure regulating means 89 contained in the backup piston 88, the control piston 90 which makes the pressure regulating means 89 regulate pressure so as to achieve a balance between the reaction force generated by the hydraulic pressure of the boosted hydraulic pressure chamber 25 and the brake operating force inputted from the brake pedal 11 via the brake stroke simulator 14, and the reaction piston 92 placed between the pressure regulating means 89 and control piston 90. The pressure regulating means 89 comprises the booster valve 116 and the pressure-reducing valve 117, where the booster valve 116 is interposed between the boosted hydraulic pressure control chamber 130 connected to the boosted hydraulic pressure chamber 25 and hydraulic power source 12 so as to open when the control piston 90 advances and close when the control piston 90 retracts, while the pressure-reducing valve 117 is interposed between the boosted hydraulic pressure control chamber 130 and reservoir 40 so as to close when the control piston 90 advances and open when the control piston 90 retracts. The control piston 90 is relatively slidably fitted in the backup piston 88 and is coaxially connected with the rear end of the reaction piston 92 whose front end faces the boosted hydraulic pressure control chamber 130 formed in the backup piston 88. The valve housing 118 is fitted and fastened in the backup piston 88 ahead of the reaction piston 92. The pressure-reducing valve 117 comprises the pressure-reducing valve seat 146 and poppet-type pressure-reducing valve disc 147, where the pressure-reducing valve seat 146 is installed on the reaction piston 92, forming the pressure-reducing valve hole 145 which is communicated with the reservoir 40 when the pressure-reducing valve 117 retracts, while the poppet-type pressure-reducing valve disc 147 is housed in the valve housing 118, being spring-urged backward to the backward limit. The booster valve 116 comprises the booster valve seat 161 and the poppet-type booster valve disc 162, where the booster valve seat 161 is installed in the valve housing 118, forming the booster valve hole 163 which is communicated with the boosted hydraulic pressure control chamber 130 and ready to accept the front end of the pressure-reducing valve disc 147, while the poppet-type booster valve disc 162 is installed in the valve housing 118, being spring-urged backward and ready to be pushed forward by the front end of the pressure-reducing valve disc 147.

Thus, the pressure regulating means 89 consisting of the control piston 90, reaction piston 92, booster valve 116, and pressure-reducing valve 117 can be preinstalled in the backup piston 88 slidably housed in the casing 15, making it easier to assemble the control piston 90, reaction piston 92, and pressure regulating means 89 to the casing 15.

Since the sealing area obtained when the booster valve disc 162 is seated on the booster valve seat 161 is set substantially equal to the pressure receiving area on the front end of the booster valve disc 162 subjected to the hydraulic pressure of the boosted hydraulic pressure chamber 25, the hydraulic forces acting on the opposite ends of the poppet-type booster valve disc 162 of the booster valve 116 are substantially equal, and thus the poppet-type booster valve disc 162 operates so as to balance the valve opening force acting on the booster valve disc 162 from the front end of the pressure-reducing valve disc 147 of the pressure-reducing valve 117 with the spring force urging the poppet-type booster valve disc 162 backward, thereby improving operational performance of the booster valve 116. The spring force which urges the poppet-type booster valve disc 162 backward is sufficient to be a weak force for the poppet-type booster valve disc 162 to follow the pressure-reducing valve disc 147, and the spring force which urges the pressure-reducing valve disc 147 backward is also sufficient to be a weak force for the pressure-reducing valve disc 147 to follow the reaction piston 92, resulting in a very weak spring force acting on the reaction piston 92. Thus, the reaction force acting on the reaction piston 92 is almost entirely attributable to the hydraulic pressure of the boosted hydraulic pressure chamber 25 to improve the reaction feeling.

The valve housing 118 is fitted and fastened in the backup piston 88 by being sandwiched between the shoulder 121 provided on the backup piston 88 to face the front and the presser member 122 screwed into the backup piston 88. Also, the communicating hole 165 is provided in the presser member 122 to communicate the hydraulic chamber 164 with the boosted hydraulic pressure chamber 25, where the hydraulic chamber 164 is formed between the presser member 122 and the valve housing 118 to face the front end of the booster valve disc 162. This makes it easier to configure a hydraulic channel used to apply the hydraulic pressure of the boosted hydraulic pressure chamber 25 to the front end of the poppet-type booster valve disc 162.

The reaction piston 92 comprises the small-diameter piston portion 92a whose front end faces the boosted hydraulic pressure control chamber 130 and the large-diameter piston portion 92b coaxially and inseparably extending to the rear end of the small-diameter piston portion 92a via the annular shoulder 92c which faces the boosted hydraulic pressure control chamber 130. The pressure-reducing valve seat 146 is coaxially installed on the reaction piston 92, with its center facing the pressure-reducing valve hole 145 communicated with the reservoir 40. The pressure-reducing valve disc 147 is housed in the boosted hydraulic pressure control chamber 130, being spring-urged toward the pressure-reducing valve seat 146 to the backward limit. The hydraulic pressure of the boosted hydraulic pressure control chamber 130 acts on one face of the elastic member 127 which is liquid-tightly and slidably penetrated by the small-diameter piston portion 92a of the reaction piston 92. The inner part of the other face of the elastic member 127 is placed to face the annular shoulder 92c so as to be deformed and pressed against the annular shoulder 92c during forward movement of the reaction piston 92 when the hydraulic pressure of the boosted hydraulic pressure control chamber 130 reaches a predetermined value.

Figure 7:
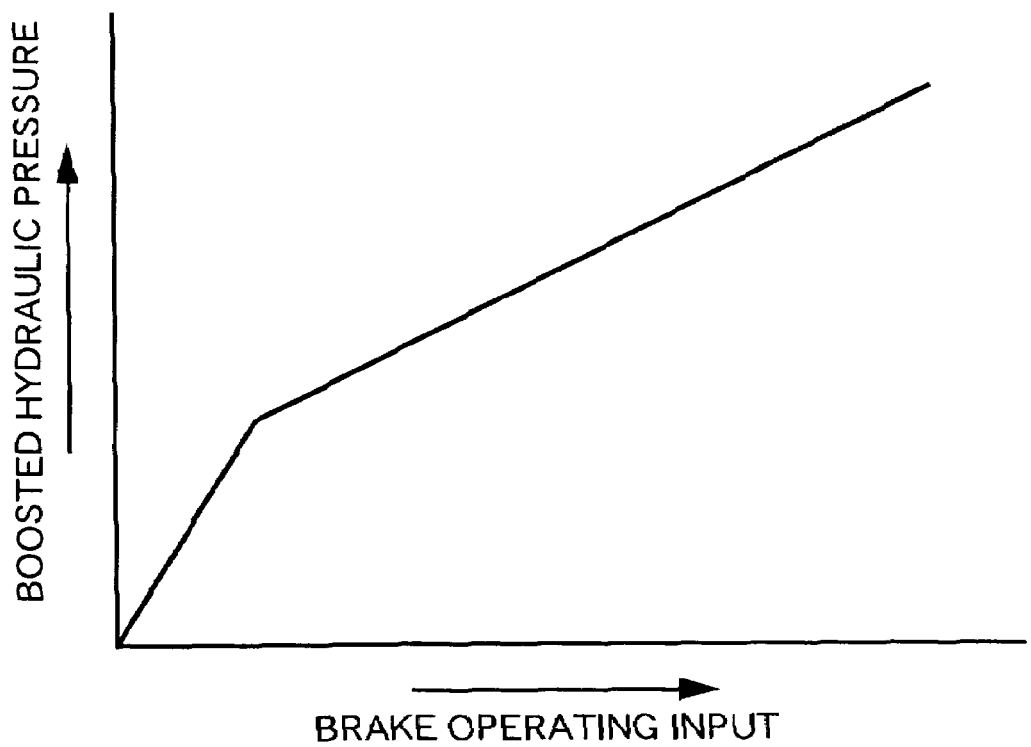
FIG. 7 is a diagram showing characteristics of reaction force.

Structure of the pressure-reducing valve 117 can be simplified by constructing the pressure-reducing valve 117 from the pressure-reducing valve seat 146 installed in the reaction piston 92 connected to the control piston 90 and the pressure-reducing valve disc 147 housed in the boosted hydraulic pressure control chamber 130 facing the front end of the reaction piston 92. The reaction force acting on the reaction piston 92 varies between two stages: a low-load stage in which the hydraulic pressure of the boosted hydraulic pressure control chamber 130 acts on the small pressure receiving surface of the small-diameter piston portion 92a of the reaction piston 92; and a high-load stage in which the hydraulic pressure of the boosted hydraulic pressure control chamber 130 acts not only on the small pressure receiving surface of the small-diameter piston portion 92a, but also on the annular shoulder 92c via the deformed elastic member 127. Thus, ideal braking characteristic can be obtained when the boosted hydraulic pressure generated by the boosted hydraulic pressure chamber 25 is varied in two stages according to the operating input from the brake pedal 11 as shown in FIG. 7.

The booster valve 116 comprises the booster valve seat 161 and poppet-type booster valve disc 162, where the booster valve seat 161 forms the booster valve hole 163 which is communicated with the boosted hydraulic pressure control chamber 130, while the poppet-type booster valve disc 162 is spring-urged backward so as to be seated on the booster valve seat 161, being ready to be pushed forward during forward movement of the control piston 90. The baffling member 150 is installed near the booster valve hole 163 in the boosted hydraulic pressure control chamber 130 to baffle the brake fluid flowing into the boosted hydraulic pressure control chamber 130 through the booster valve hole 163. Thus, when the high-pressure brake fluid from the hydraulic power source 12 flows into the boosted hydraulic pressure control chamber 130 through the booster valve hole 163 upon opening of the booster valve 116, the brake fluid is baffled by the baffling member 150, which reduces operating noise and pulsating noise resulting from the operation of the booster valve 116.

The reaction piston 92 is equipped with an insertion hole 143 whose front end is communicated with the boosted hydraulic pressure control chamber 130 and which extends coaxially with the boosted hydraulic pressure control chamber 130, and a through-hole 144 which has a shaft hole 144a coaxial with the insertion hole 143 and which is communicated with the release chamber 135. A flange-shaped pressure-reducing valve seat 146 sticks out radially inward between the insertion hole 143 and shaft hole 144a. The rear end of the pressure-reducing valve disc 147 which forms the pressure-reducing valve 117 in cooperation with the pressure-reducing valve seat 146 is inserted into the insertion hole 143 so as to form the annular orifice 148 between itself and the reaction piston 92 ahead of the pressure-reducing valve seat 146. Thus, when high pressure in the boosted hydraulic pressure control chamber 130 is released to the release chamber 135 upon opening of the pressure-reducing valve 117, the high pressure passes through a narrow channel between the pressure-reducing valve disc 147 and pressure-reducing valve seat 146 after being throttled preliminarily by the annular orifice 148 formed between the pressure-reducing valve disc 147 of the pressure-reducing valve 117 and reaction piston 92. This makes changes in the flow rate of the brake fluid relatively modest, reducing the operating noise of the pressure-reducing valve 117 resulting from abrupt changes in the flow rate.

Furthermore, the reaction piston 92 is equipped with the through-hole 144 which makes the boosted hydraulic pressure control chamber 130 communicated with the release chamber 135 when the pressure-reducing valve 117 is opened. The variable throttle mechanism 154 is provided between the sleeve 125 and reaction piston 92, with the sleeve 125 being fastened to the backup piston 88 to slidably accept the reaction piston 92. The variable throttle mechanism 154 passes the brake fluid through the through-hole 144 to the release chamber 135 at full throttle when the brake pedal 11 is inoperative and the reaction piston 92 is inoperative, but limits passage of the brake fluid through the through-hole 144 to the release chamber 135 when the reaction piston 92 is operated via the brake pedal 11.

Thus, when high pressure in the boosted hydraulic pressure control chamber 130 is released to the release chamber 135 upon opening of the pressure-reducing valve 117, the flow of the brake fluid to the release chamber 135 through the through-hole 144 in the reaction piston 92 is throttled, releasing the high hydraulic pressure slowly to the release chamber 135, thereby reducing operating noise.

A very simple configuration can be given to the variable throttle mechanism 154: the sleeve 125 is placed with its rear end facing the release chamber 135; the through-hole 144 is composed of the shaft hole 144a provided in the reaction piston 92 with its front end communicated with the pressure-reducing valve hole 145 and the caves 144b which extend to the shaft hole 144a and open to an outer surface of the reaction piston 92; and the variable throttle mechanism 154 is composed of the rear end of the sleeve 125 and caves 144b.

Moreover, since the tapered expanded diameter portion 125a which widens toward the open end is formed in the inner circumference of the rear end of the sleeve 125, it is possible to obtain an appropriate amount of throttling by varying the amount of throttling according to the operation of the reaction piston 92.

The control piston 90 is formed into a bottomed cylindrical shape with its front end closed. The control piston 90 is opened to the atmosphere by the brake stroke simulator 14 it houses. The brake stroke simulator 14 comprises the input piston 166 as well as the elastic body 167 and coil spring 168, where the input piston 166 is linked to the brake pedal 11 via the input rod 170, is axially slidably housed in the control piston 90, and has a backward limit fixed by the snap ring 169 detachably mounted on the rear part of the control piston 90, while the elastic body 167 and coil spring 168 are connected in series and interposed between the input piston 166 and control piston 90.

Thus, the brake stroke simulator 14 is housed in the control piston 90 of the hydraulic booster 13. This reduces the total axial length of the hydraulic booster 13 and brake stroke simulator 14. Also, even if the brake stroke simulator 14 malfunctions, brake operating force can be inputted to the control piston 90 from the brake pedal 11 via the brake stroke simulator 14. Moreover, the brake stroke simulator 14 is configured to provide a stroke feeling of brake pedal 11 using the spring forces of the elastic body 167 and coil spring 168, without using hydraulic fluid. This makes it easier to assemble the brake stroke simulator 14 to the control piston 90.

Figure 8:
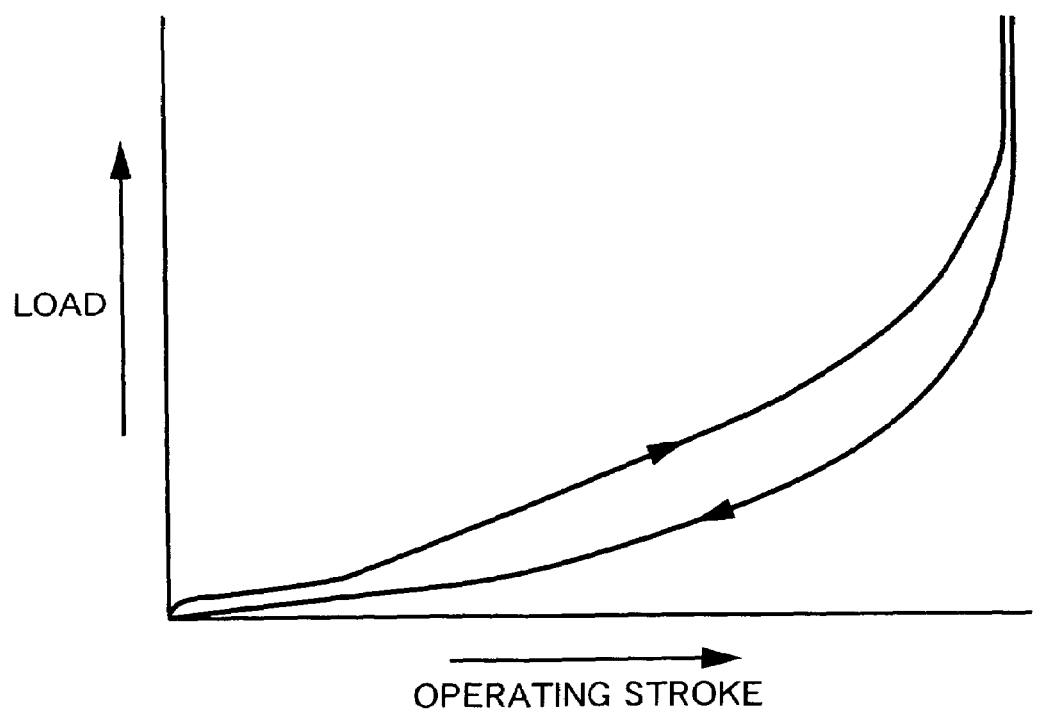
FIG. 8 is diagram showing operating characteristics of the brake stroke simulator.

The brake operating force applied to the input piston 166 by the brake pedal 11 is transmitted to the control piston 90 via the intermediate transmitting member 171 and then via the elastic body 167 and coil spring 168 connected in series. The coil spring 168 is smaller in spring constant than the elastic body 167. Thus, as shown in FIG. 8, in a region where brake operating load is small, the operating load changes moderately with respect to the amount of change in the operating stroke of the brake pedal 11, since the brake pedal 11 is pressed down against the spring force of the coil spring 168. However, in a region where the brake operating load is large, the operating load changes relatively greatly with respect to the amount of change in the operating stroke of the brake pedal 11, since the brake pedal 11 is pressed down against the spring force of the elastic body 167.

Besides, since the elastic body 167 is formed into a cylindrical shape so that it will come into resilient contact with the inner circumference of the control piston 90 by expanding its diameter under an axial compressive force produced by forward movement of the input piston 166, when pressing down the brake pedal 11, the brake pedal 11 must be operated with such an operating force that overcomes the sum of the resilient force of the elastic body 167 and the frictional force between the elastic body 167 and control piston 90. However, when relaxing the brake operating force, the frictional force acts on the brake pedal 11 in the direction opposite to the returning direction of the brake pedal 11, while the elastic body 167 remains in sliding contact with the inner circumference of the control piston 90. Thus, the brake stroke simulator 14 can increase hysteresis width in relationship between brake operating stroke and operating load as shown in FIG. 8, thereby reducing the driver's burden.

Since the elastic body 167 is preloaded with the coil spring 168, even if the elastic body 167 loses elasticity, the loss of elasticity is absorbed by the coil spring 168, and it is possible to eliminate a feel of an idle stroke during a normal braking operation and obtain two-step operating simulation characteristics using the elastic body 167 and coil spring 168 irrespective of the loss of elasticity of the elastic body 167.

Figure 9:
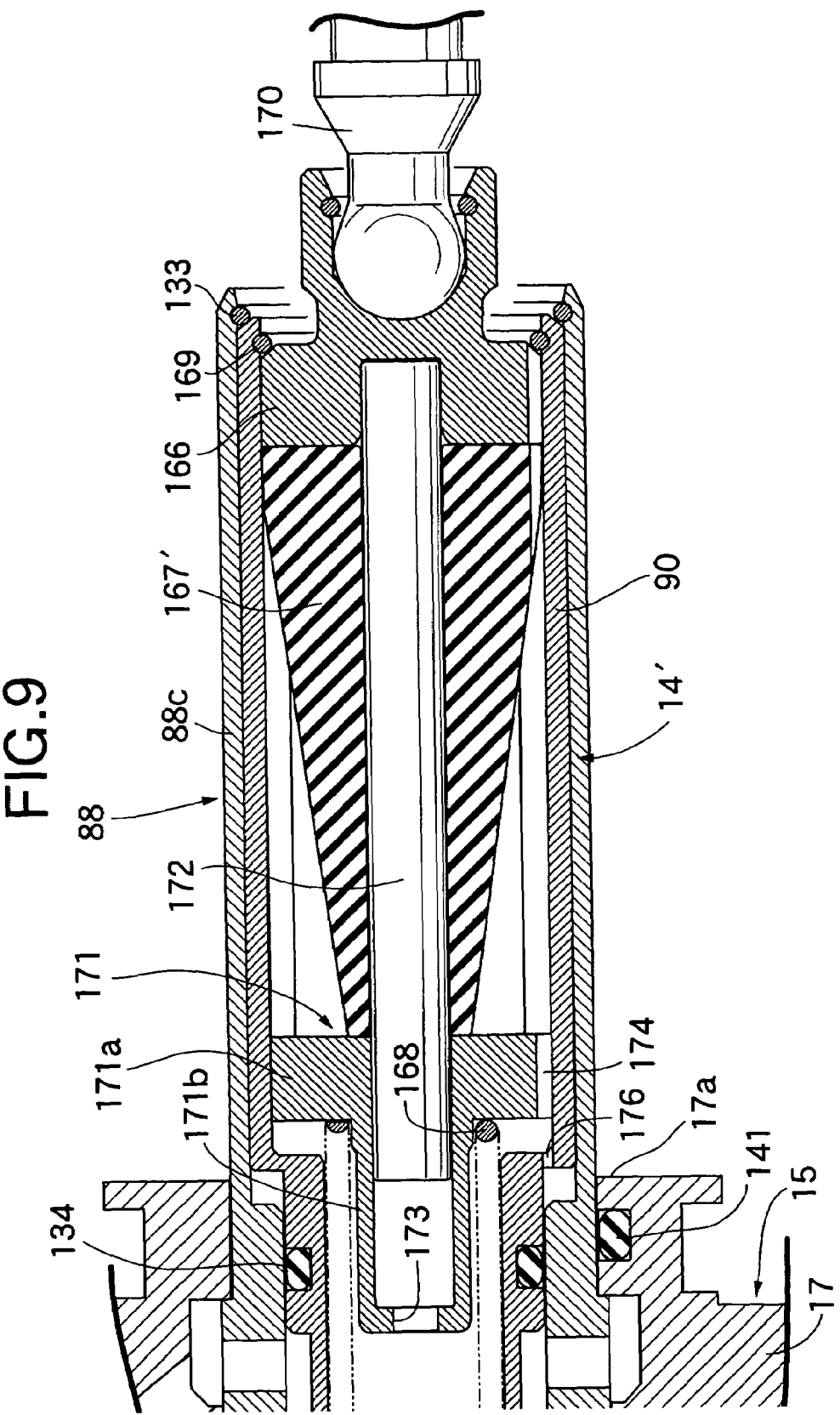
FIG. 9 is an enlarged longitudinal sectional view of a brake stroke simulator according to a second embodiment of the present invention.

FIG. 9 shows a second embodiment of the present invention, where a brake stroke simulator 14' comprises an input piston 166 axially slidably housed in a control piston 90, as well as an elastic body 167' and the coil spring 168 interposed in series between the input piston 166 and control piston 90. The brake stroke simulator 14' is housed in the control piston 90 and opens the control piston 90 to the atmosphere.

The elastic body 167' is made of elastic material such as rubber and has a cylindrical shape. The elastic body 167' and the metallic coil spring 168 smaller in spring load than the elastic body 167' are interposed in series between the input piston 166 and control piston 90 via an intermediate transmitting member 171.

The elastic body 167' is formed into a cylindrical shape with its outer circumference tapered in the axial direction such that one end is larger in diameter than the other. The elastic body 167' comes into resilient contact with the inner circumference of the control piston 90 by expanding its diameter under an action of compressive force produced by forward movement of the input piston 166.

According to the second embodiment, in addition to the same effect as in the first embodiment, it possible to regulate the amount of changes in the area of sliding contact between the elastic body 167' and control piston 90 in response to the operating stroke of a brake pedal 11, thus regulating the hysteresis width.

While the embodiments of the present invention have been described above, the present invention is not limited to the embodiments described above, and various design changes may be made without departing from the subject matter of the present invention set forth in the appended claims.

For example, although a vehicle braking system equipped with a tandem master cylinder M has been described in the above embodiments, the present invention is also applicable to a vehicle braking system equipped with a master cylinder in which a single master piston is slidably housed in a casing.

What is claimed is:

1. A vehicle braking system comprising:
    a master cylinder in which a master piston with its back turned to a boosted hydraulic pressure chamber is slidably housed in a casing;
    a backup piston which is slidably housed in the casing with its front face turned to the boosted hydraulic pressure chamber and with its backward limit fixed, to push the master piston directly from behind in response to operation of a brake operating member when the hydraulic pressure of the boosted hydraulic pressure chamber decreases; and
    pressure regulating means which applies output hydraulic pressure of a hydraulic power source to the boosted hydraulic pressure chamber after regulating the output hydraulic pressure according to brake operating input from the brake operating member;
    the master cylinder being connected to wheel brakes,
    wherein the backup piston comprises a piston body which is slidably fitted in the casing with substantially the same seal diameter as a seal diameter of the master piston, and a pusher which is slidably fitted in the casing with a seal diameter smaller than the seal diameters of the master piston and the piston body and which coaxially extends to the front end of the piston body so as to abut against and push the rear end of the master piston,
    wherein an annular input chamber is formed between the backup piston and the casing so as to be communicated with the hydraulic power source, with axially opposite ends of the annular input chamber sealed by sealing members interposed between the piston body and the casing and between the pusher and the casing, respectively,
    wherein the backup piston contains pressure regulating means interposed between an output chamber and the input chamber which are connected to the boosted hydraulic pressure chamber, so as to communicate the input chamber with the output chamber and to communicate the output chamber with a reservoir when the output hydraulic pressure of the hydraulic power source decreases, and
    wherein when the pusher pushes the master piston forward, amount of volume increased in the boosted hydraulic pressure chamber is set to be substantially equal to amount of volume decreased in the input chamber.

2. The vehicle braking system according to claim 1, wherein spring-urging means which urges the backup piston and the master piston in a direction to separate the pistons from each other is installed between the pistons whose fully retracted positions in the casing are limited.

3. The vehicle braking system according to claim 2, wherein the combined force of backward hydraulic pressure which acts on the backup piston as the output hydraulic pressure of the hydraulic power source acts on the input chamber and spring force of the spring-urging means which urges the backup piston in the backward direction is set at 300 to 1000 N.

4. The vehicle braking system according to claim 1, wherein a normally closed linear solenoid valve for automatic brake pressurization is interposed between the hydraulic power source and the boosted hydraulic pressure chamber, while a normally open linear solenoid valve for automatic brake depressurization and a first one-way valve are interposed between the output chamber and the boosted hydraulic pressure chamber, where the first one-way valve is connected in parallel to the linear solenoid valve for automatic brake depressurization to allow the brake fluid to flow from the output chamber to the boosted hydraulic pressure chamber.

5. The vehicle braking system according to claim 2, wherein a normally closed linear solenoid valve for automatic brake pressurization is interposed between the hydraulic power source and the boosted hydraulic pressure chamber, while a normally open linear solenoid valve for automatic brake depressurization and a first one-way valve are interposed between the output chamber and the boosted hydraulic pressure chamber, where the first one-way valve is connected in parallel to the linear solenoid valve for automatic brake depressurization to allow the brake fluid to flow from the output chamber to the boosted hydraulic pressure chamber.

6. The vehicle braking system according to claim 3, wherein a normally closed linear solenoid valve for automatic brake pressurization is interposed between the hydraulic power source and the boosted hydraulic pressure chamber, while a normally open linear solenoid valve for automatic brake depressurization and a first one-way valve are interposed between the output chamber and the boosted hydraulic pressure chamber, where the first one-way valve is connected in parallel to the linear solenoid valve for automatic brake depressurization to allow the brake fluid to flow from the output chamber to the boosted hydraulic pressure chamber.

7. The vehicle braking system according to claim 1, wherein a normally closed pressure-reducing linear solenoid valve for regeneration and coordination is interposed between the boosted hydraulic pressure chamber and the reservoir, while a normally open pressurizing linear solenoid valve for regeneration and coordination and a second one-way valve are interposed between the output chamber and the boosted hydraulic pressure chamber, where the second one-way valve is connected in parallel to the pressurizing linear solenoid valve for regeneration and coordination to allow the brake fluid to flow from the boosted hydraulic pressure chamber to the output chamber.

* * * * *